United States Patent [19]

Fujisawa et al.

[11] Patent Number: 5,340,660
[45] Date of Patent: Aug. 23, 1994

[54] SLIDE MEMBER

[75] Inventors: Yoshikazu Fujisawa; Makoto Tsuji; Takeshi Narishige; Takahiro Gunji; Kazuhisa Okamoto, all of Saitama, Japan

[73] Assignee: Honda Giken Kogyo Kabushiki Kaisha, Tokyo, Japan

[21] Appl. No.: 917,164

[22] Filed: Jul. 20, 1992

[30] Foreign Application Priority Data

Jul. 18, 1991 [JP] Japan .................. 3-202193
Jul. 18, 1991 [JP] Japan .................. 3-202194
Jul. 18, 1991 [JP] Japan .................. 3-202197

[51] Int. Cl.$^5$ .................. C23F 3/00; C16C 33/06; C16C 33/12
[52] U.S. Cl. .................. 428/687; 428/935; 384/912
[58] Field of Search .................. 428/643, 644, 645, 687, 428/935; 384/912, 913

[56] References Cited

U.S. PATENT DOCUMENTS

| 2,586,099 | 2/1952 | Schultz ............... 428/645 |
| 4,470,184 | 9/1984 | Fukuoka et al. ....... 384/913 |
| 4,830,933 | 5/1989 | Hodes et al. .......... 428/646 |
| 4,832,809 | 5/1989 | Hodes et al. .......... 204/192.15 |
| 4,937,149 | 6/1990 | Mori .................. 428/645 |

FOREIGN PATENT DOCUMENTS

| 3601438 | 4/1987 | Fed. Rep. of Germany . |
| 3601439 | 4/1987 | Fed. Rep. of Germany . |
| 4101386 | 7/1991 | Fed. Rep. of Germany . |
| 2084191 | 4/1982 | United Kingdom ......... 205/253 |

OTHER PUBLICATIONS

G. Roventi et al., "Electrodeposition of lead alloys from fluoborate baths", Journal of Applied Electrochemistry, 14 (1984) pp. 505–510.
German Official Action, May 1993, 3 pages.

Primary Examiner—John Zimmerman
Attorney, Agent, or Firm—Lyon & Lyon

[57] ABSTRACT

A slide member includes a surface layer having a slide surface for sliding on a mating member, wherein the surface layer has metal crystals belonging to a cubic system with a crystal plane of high atomic density directed toward the slide surface and form the slide surface.

3 Claims, 32 Drawing Sheets

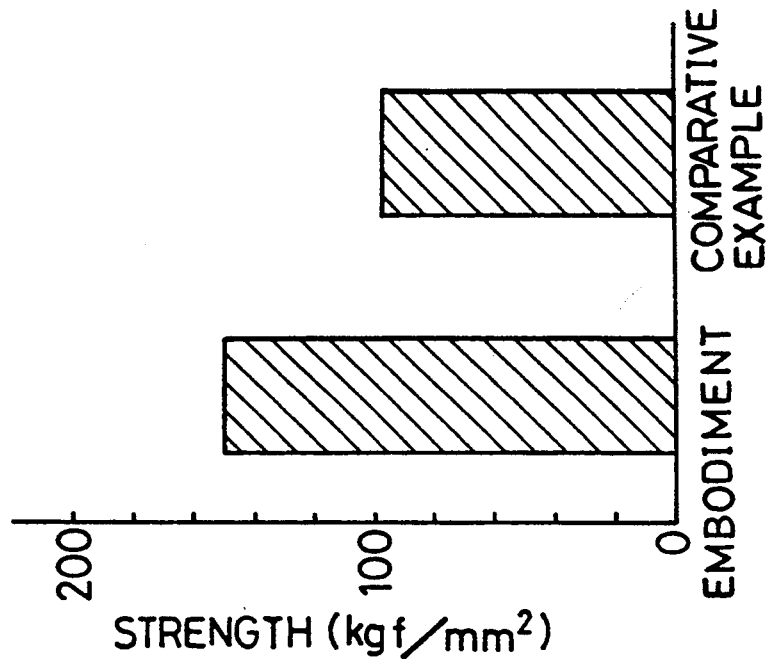
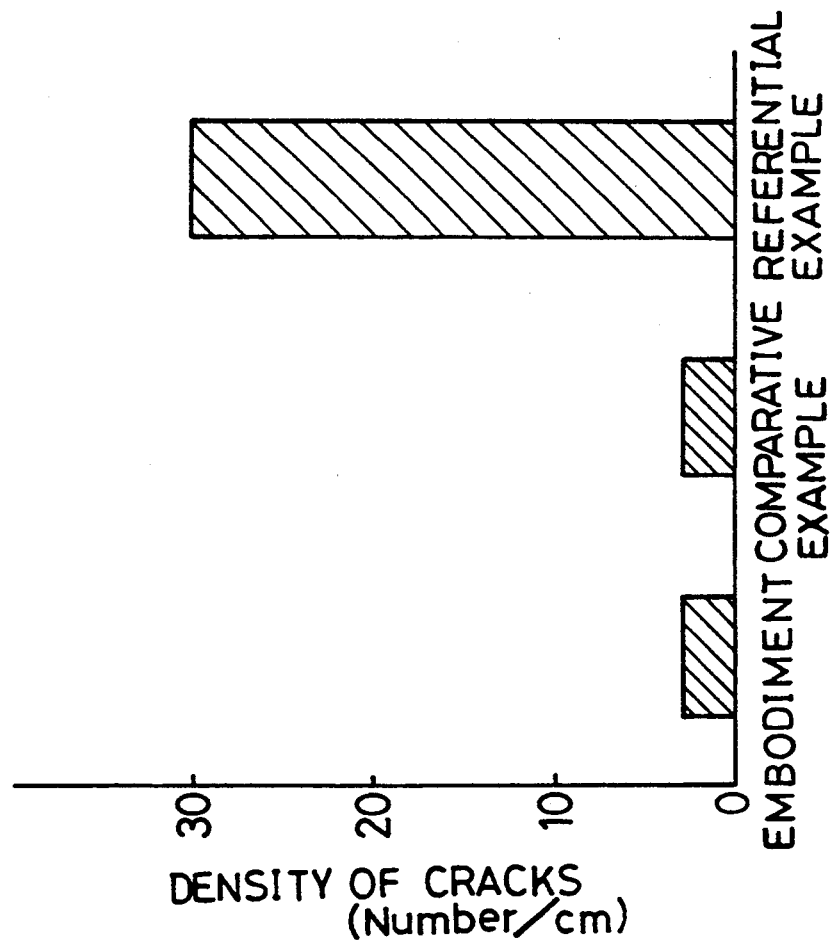

⊢⎯⎯⎯⏌1μm

⊢⎯⎯⎯⎯⎯⏌5μm

SLIDE MEMBER

BACKGROUND OF THE INVENTION

1. Field of the Invention

This invention relates to a slide member, and more particularly, to a slide member comprising a surface layer having a slide surface for a mating member.

2. Description of the Prior Art

There are conventionally known as a slide member of such type: a piston for an internal combustion engine, which has a base material of an Al alloy provided with grooves for receiving piston rings, wherein the inner surface of the groove is provided with a surface layer comprised of a metal plated layer so as to improve the wear resistance of the groove; a piston for an internal combustion engine, which has a base materal of an Al alloy provided with a surface layer comprised of a metal plated layer on an outer peripheral surface of its skirt portion so as to improve the wear resistance of the skirt portion; a slide bearing with a surface layer comprised of a Pb alloy; and similar constructions.

However under existing circumstances where it has been desired to increase speed and output of an engine, the surface layer of the above-described pistons suffers from a poor wear resistance due to a low hardness and also from a low strength.

The above-described slide bearing is applicable to a journal portion of a crankshaft, an enlarged end of a connecting rod or the like in an internal combustion engine. However under the above-described circumstances, the surface layers of the prior art slide bearings suffer from an insufficient oil retention property and a poor seizure resistance due to an inferior initial conformability.

SUMMARY OF THE INVENTION

It is an object of the present invention to provide a slide member of the type described above, which has a surface layer formed to have a high hardness by specifying the metal crystal structure of the surface layer, thereby improving the wear resistance and the strength of the surface layer.

It is another object of the present invention to provide a slide member of the type described above, wherein the sufficient oil retention property is achieved on the surface layer and the initial conformability of the surface layer can be improved by specifying the metal crystal structure of the surface layer, thereby providing an increased seizure resistance of the surface layer.

To achieve the above objects, according to the present invention, there is provided a slide member, comprising a surface layer having a slide surface for a mating member, wherein the surface layer has a metal crystal structure belonging to a cubic system with crystal planes of metal crystals of high atomic density being directed so as to form the slide surface.

The crystal planes are planes of the metal crystal and the percent area A of the close-packed planes in the slide surface is set in the range of $A \geq 30\%$. In addition, the metal crystal has a body-centered cubic structure, and the crystal plane is a secondary slip plane. The percent area B of the secondary slip planes in the slide surface is set in the range of $B \geq 50\%$.

By providing the metal crystal structure of the surface layer as described above, a high hardness of the surface layer can be achieved, thereby providing the slide member with an improved wear resistance and an improved strength.

In addition, according to the present invention, there is provided a slide member comprising a surface layer having a slide surface for a mating member, wherein the surface layer is formed of an aggregate of crystals of a Pb alloy, the aggregate including first oriented crystals with planes (h00) by Miller indices thereof directed toward the slide surface and second oriented crystals with planes (111) and (222) by Miller indices thereof directed toward the slide surface. Under application of an X-ray diffractometry to the surface layer, where an integrated strength of the first oriented crystals is represented by I(a) and an integrated strength of the second oriented crystals is represented by I(b), the following relation is established: $0.6 \leq I(a)/\Sigma I(ab) \leq 1.0$ wherein $\Sigma I(ab) = I(a) + I(b)$, and $I(b) = 0$ is included.

By specifying the metal crystal structure of the surface layer as described above, the slide member can have an increased seizure resistance of the surface layer.

The above and other objects, features and advantages of the present invention will become apparent from a consideration of the following description of the preferred embodiments, taken in conjunction with the accompanying drawings.

BRIEF DESCRIPTION OF THE DRAWINGS

FIGS. 1–11 show a first embodiment of the invention, wherein

FIG. 1 is a side view of a piston;

FIG. 2 is an enlarged sectional view taken along a line 2—2 in FIG. 1;

FIG. 5 is an X-ray diffraction pattern for Fe crystals in a surface layer;

FIG. 6 is a photomicrograph showing a structure of the Fe crystals in a slide surface;

FIG. 7 is an X-ray diffraction pattern for Cr crystals in a surface layer;

FIG. 8 is an X-ray diffraction pattern for Ni crystals in a surface layer;

FIG. 9 is a photomicrograph showing a structure of the Ni crystals in a slide surface;

FIG. 10 is a graph illustrating the relationship between the percent area A of a close-packed plane in a slide surface and the hardness of a surface layer; and FIG. 11 is a graph illustrating the relationship between the percent area A of a close-packed plane in a slide surface and the amount of wear of a surface layer.

FIGS. 12–22 show a second embodiment of the invention, wherein

FIG. 12 is a side view of a piston;

FIG. 13 is an enlarged sectional view taken along a line 13—13 in FIG. 12;

FIG. 14 is a perspective view illustrating a secondary slip plane of a body-centered cubic structure;

FIG. 15 is an illustration for explaining an inclination of a secondary slip plane of a body-centered cubic structure;

FIG. 16 is an X-ray diffraction pattern for Fe crystals in a surface layer;

FIG. 17 is a photomicrograph showing a structure of the Fe crystals in a slide surface;

FIG. 19A is a graph illustrating the density of cracks in surface layers according to the embodiment, the comparative example and a referential example;

FIG. 19B is a graph illustrating the strength of surface layers according to the embodiment and the comparative example;

FIG. 20 is a plan view of a test piece;

FIG. 21 is an X-ray diffraction pattern for Fe crystals in a surface layer in another form of the embodiment; and FIG. 22 is a photomicrograph showing a structure of the Fe crystals in a slide surface in a further form of the embodiment.

FIGS. 23–33 show a third embodiment of the invention, wherein

FIG. 23 is an exploded plan view of a slide bearing;

FIG. 24 is an enlarged sectional view taken along a line 24–24 in FIG. 23;

FIG. 25 is a schematic view of an essential portion of the slide surface;

FIG. 26 is a schematic longitudinal sectional view of an essential portion of the surface layer;

FIG. 27 is an illustration for explaining the measurement of the inclination angle of a first oriented crystal;

FIG. 28 is an X-ray diffraction pattern for Pb alloy crystals in the surface layer;

FIG. 29 is a photomicrograph showing a structure of the Pb alloy crystals in the slide surface;

FIG. 30 is a photomicrograph showing a structure of Pb alloy crystals, taken through a longitudinal section of the surface layer;

FIG. 31 is a photomicrograph showing a structure of Pb alloy crystals in another form of the slide surface;

FIG. 32 is a graph illustrating the relationship between the presence rate $R_1$ of first oriented crystals and the surface pressure of the surface layer when seizure occurs; and FIG. 33 is a graph illustrating the relationship between the presence rate $R_2$ of third oriented crystals and the surface pressure of the surface layer when seizure occurs.

DESCRIPTION OF THE PREFERRED EMBODIMENTS

FIGS. 1 to 11 show a first embodiment of the present invention.

Figure 1:
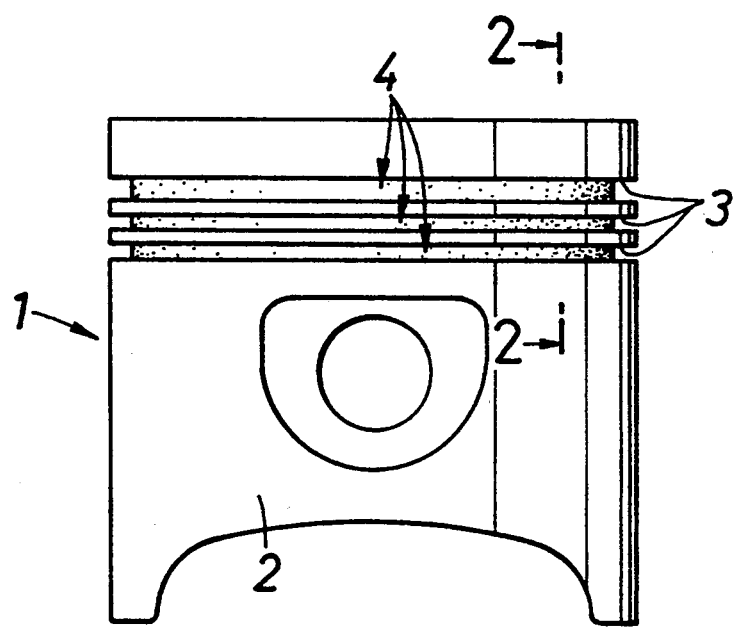
Figure 2:
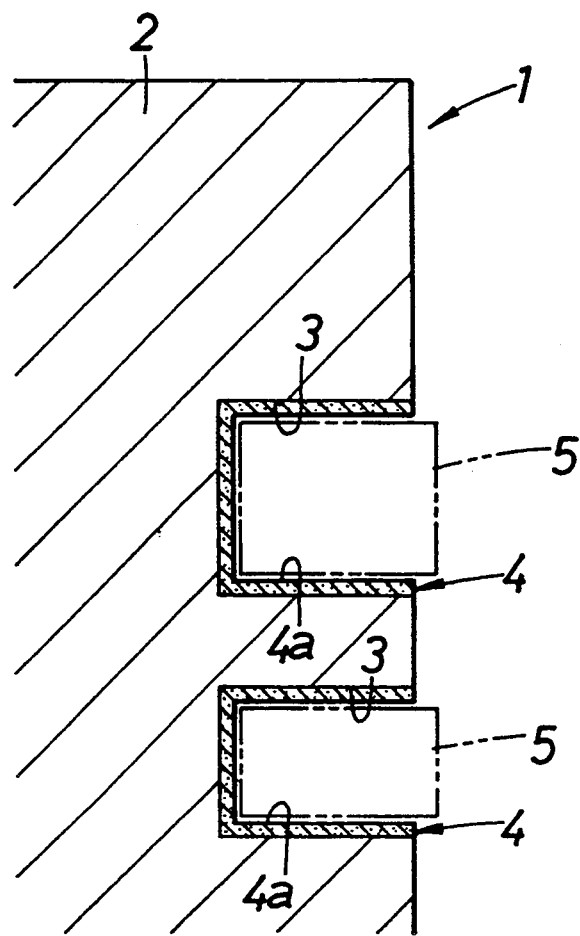

Referring to FIGS. 1 and 2, a piston 1, serving as a slide member for an internal combustion engine, has a base material 2 of an Al alloy, which has grooves 3 for receiving piston rings 5. A surface layer 4 is provided on an inner surfaces of each groove 3 of the base material 2. The surface layer 4 has a slide surface 4a in contact with the piston ring 5 serving as a mating member.

The surface layer 4 is formed by an electroplating process and comprises an aggregate of metal crystals belonging to a cubic system. A face-centered cubic structure (which is called an fcc structure hereinafter) and a body-centered cubic structure (which is called a bcc structure hereinafter) are included in the cubic system.

Metals having a fcc structure are listed, for example, as Pb, Ni, Cu, Al, Ag, Au and the like. Metals having a bcc structure are listed, for example, such as Fe, Cr, Mo, W, Ta, Zr, Nb, V and the like.

Figure 3A:
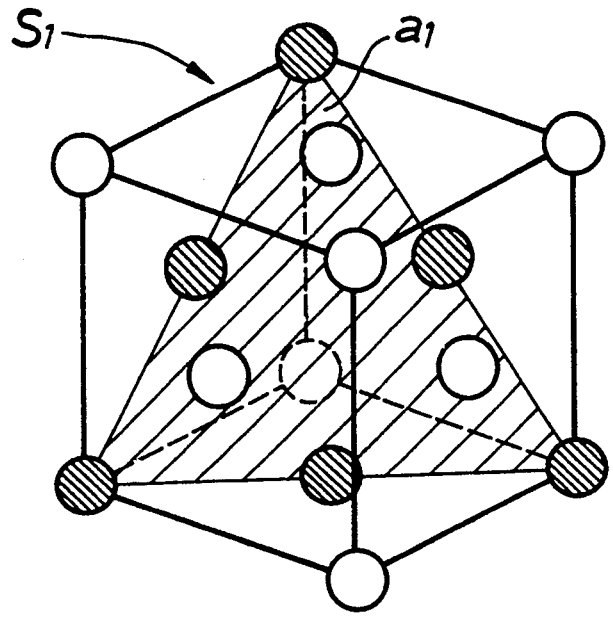
FIG. 3A is a perspective view illustrating a close-packed plane of a face-centered cubic structure.
Figure 3B:
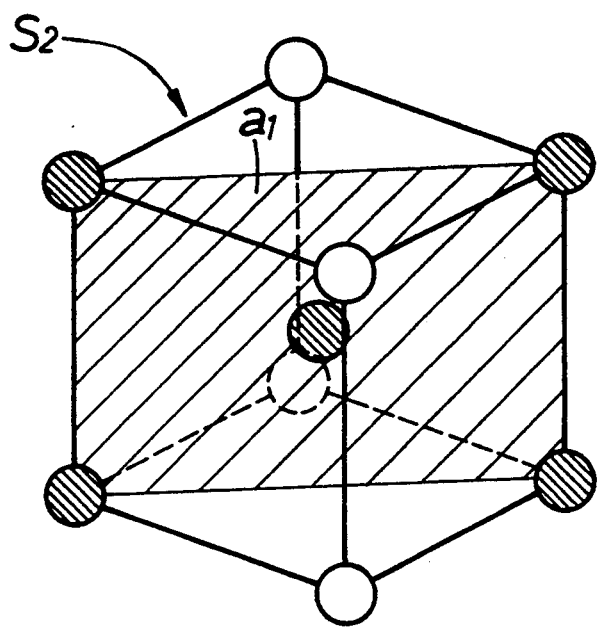
FIG. 3B is a perspective view illustrating a close-packed plane of a body-centered cubic structure.

As shown in FIG. 3A, a close-packed plane $a_1$ in the fcc structure $S_1$ is a (111) plane (by Miller indices) including six atoms. A close-packed plane $a_1$ in the bcc structure $S_2$ is a (110) plane (by Miller indices) including five atoms, as shown in FIG. 3B.

Predetermined crystals of the metal crystals have their close-packed planes $a_1$ as the crystal surface of a high atomic density directed so as to define the slide surface 4a. The percent area A of the close-packed planes $a_1$ in the slide surface 4a is set in the range of $A \geq 30\%$.

Since the close-packed plane $a_1$ is higher in atomic density than the other crystal surfaces, a high hardness can be achieved in the slide surface 4a, namely the surface layer 4 by providing the percent area A as described above. This leads to an improvement in the wear resistance. When the percent area A is less than 30%, the hardness in the surface layer 4 deteriorates.

An inclination of the close-packed plane $a_1$ with respect to a phantom plane C extending along the slide surface 4a affects the wear resistance of the surface layer 4.

Figure 4A:
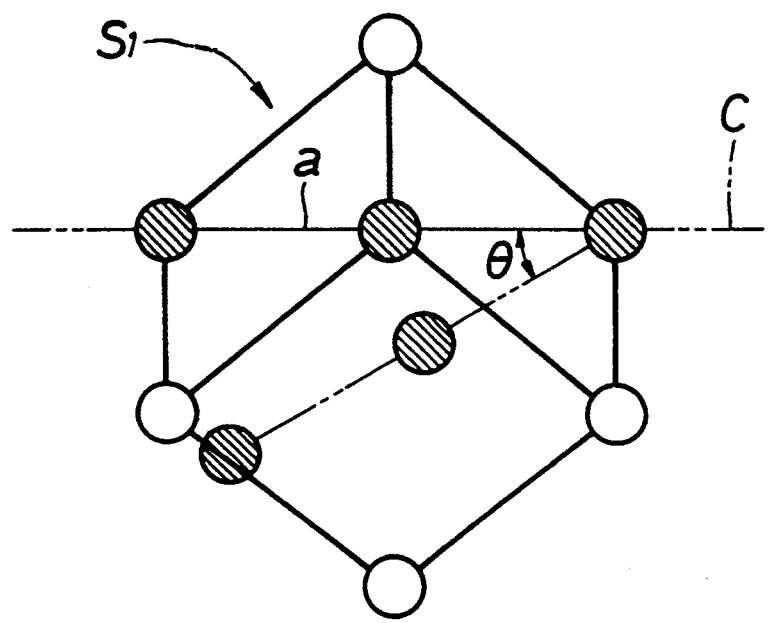
FIG. 4A is an illustration for explaining an inclination of the close-packed plane of the face-centered cubic structure.
Figure 4B:
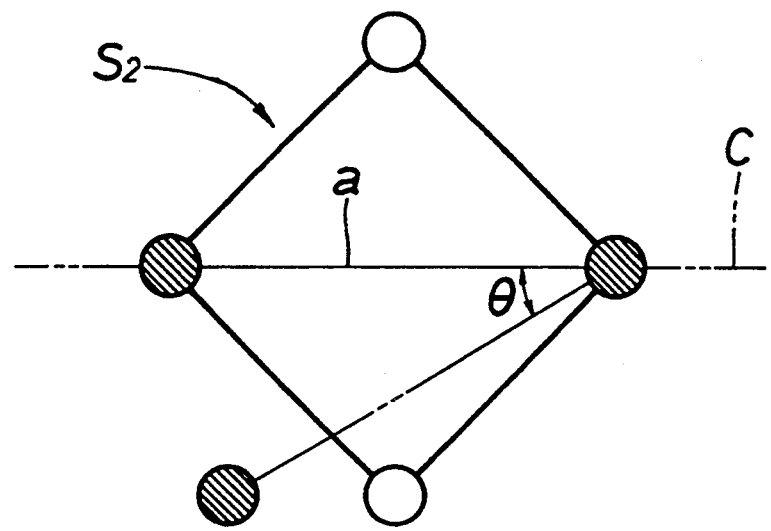
FIG. 4B is an illustration for explaining an inclination of the close-packed plane of the body-centered cubic structure.

The inclination angle $\Theta$ of the close-packed plane $a_1$ of the fcc structure $S_1$ with respect to a phantom plane C is set in the range of $0° \leq \Theta \leq 20°$ as shown in FIG. 4A. The inclination angle $\Theta$ of the close-packed plane $a_1$ of the bcc structure $S_2$ with respect to a phantom plane C is set in the range of $0° \leq \Theta \leq 20°$ as shown in FIG. 4B. When the inclination angle $\Theta$ becomes larger than 20°, the wear resistance of the surface layer deteriorates.

Some preferred examples will be described below.

The inner surface of the annular recess 3 in the base material 2 of an Al alloy was subjected to an electroplating process so as to form the surface layer 4 comprised of an aggregate of Fe crystals.

The conditions for the electroplating process were as follows: a plating bath of ferrous sulfate was used; the pH of the plating bath was 3 or less (constant); an additive of carbamide, boric acid, saccharin and ammonium sulfate was used; the temperature of the plating bath was 50° C.; and the cathode current density was 8 A/dm$^2$.

Figure 5:
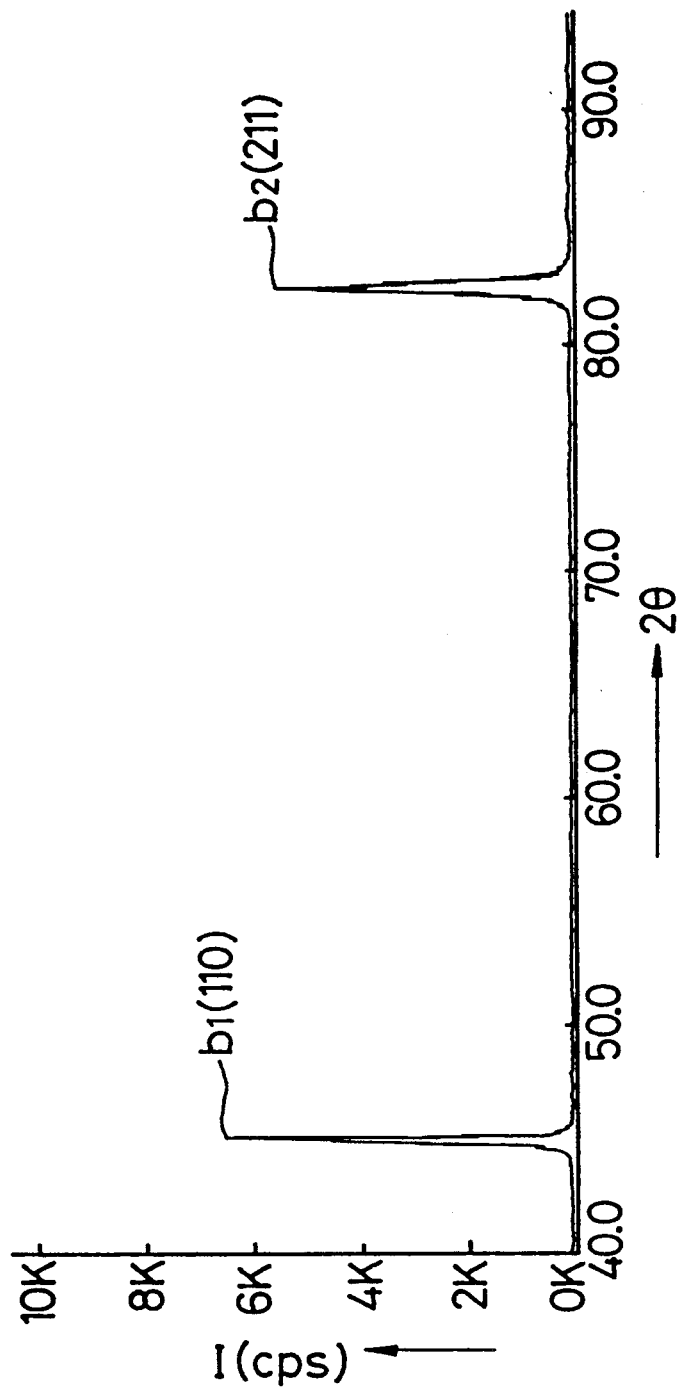
Figure 6:
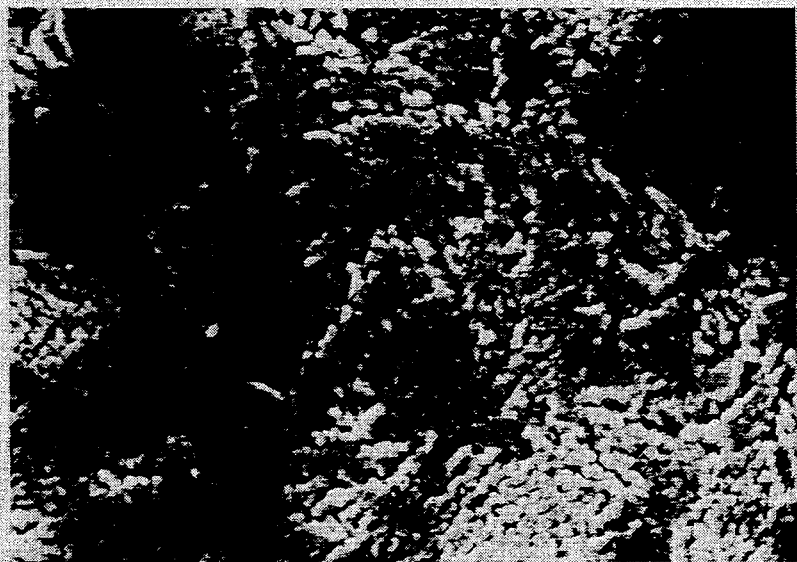

FIG. 5 is a X-ray diffraction pattern diagram for Fe crystals in the surface layer 4, wherein a peak $b_1$ indicates a plane (110) as the close-packed plane $a_1$, and a peak $b_2$ indicates a plane (211). It can be seen from FIG. 5 that there exist in the surface layer 4 Fe crystals which are oriented so that their close-packed planes $a_1$ lie in a plane parallel to the phantom plane C extending along the slide surface 4a.

In this case, the greater the height of the peak $b_1$ and thus the the integrated strength of peak $b_1$, the greater the degree of orientation of plane $a_1$ of the Fe crystals is with respect to phantom plane C. This results in an increased percent area A occupied by the close-packed planes $a_1$ in the slide surface 4a. The degree of orientation is controlled by varying the conditions for the electroplating process. In FIG. 5, the percent area A of the closepacked planes $a_1$ in the slide surface 4a is equal to 30% (A=30%). The Fe crystal structure of the Fe in the slide surface 4a is shown by an electron photomicrograph (5,000× magnification) in FIG. 6.

Two base materials 2 were prepared. The inner surface of the groove 3 of one of the base materials 2 was subjected to an electroplating process so as to form a surface layer 4 comprised of Cr crystals. A surface layer comprised of Ni crystals was formed on the inner surface of the groove 3 of the other of the base materials 2 in the same manner.

Figure 7:
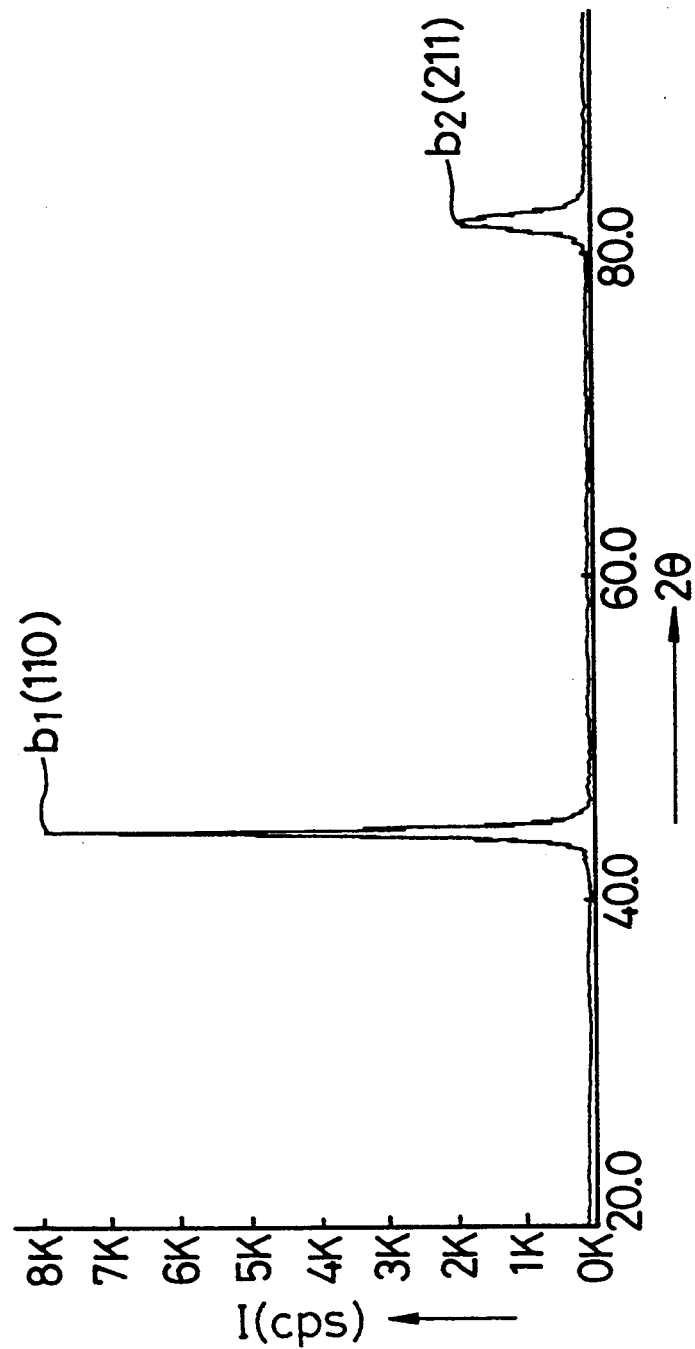

FIG. 7 is a X-ray diffraction pattern diagram for the Cr crystals in the surface layer 4, wherein a peak b, indicates a plane (211). In this case, the percent area A of the close-packed plane (110) as the close-packed plane $a_1$, and a peak $b_2$ indicates planes $a_1$ in the slide surface 4a is equal to 65%.

Figure 8:
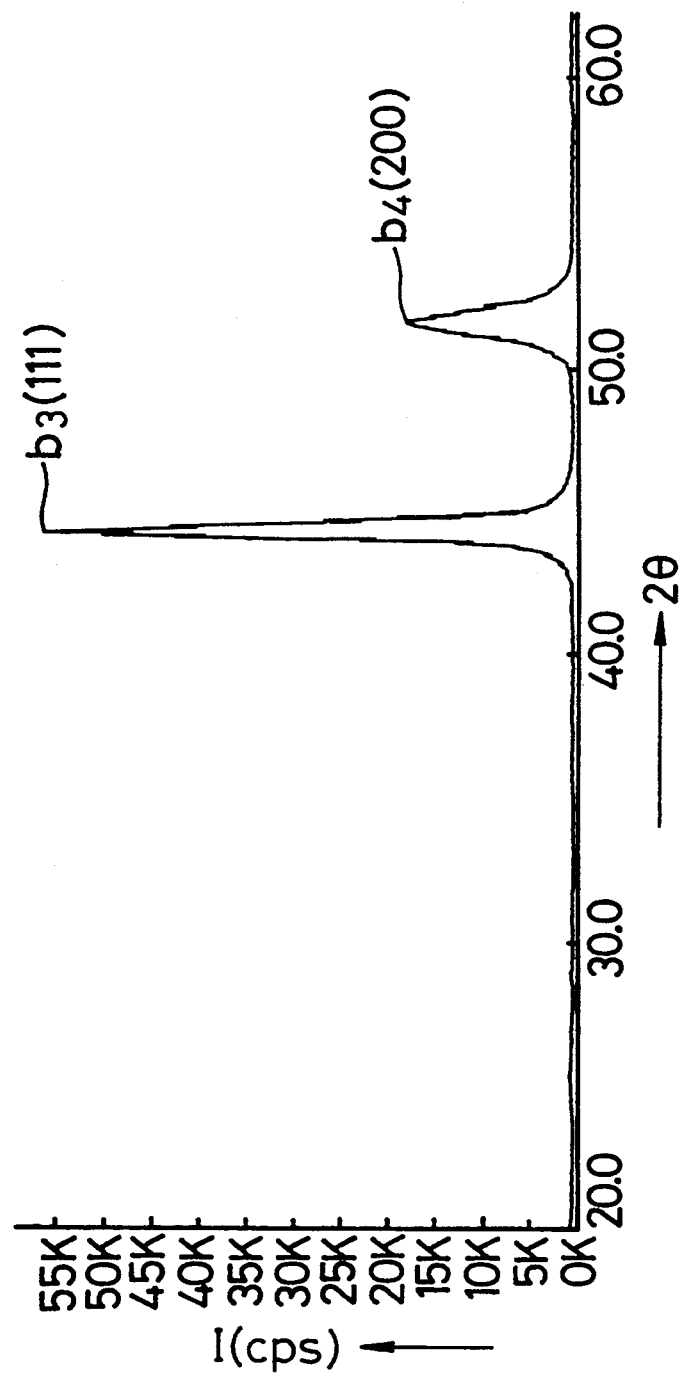
Figure 9:

FIG. 8 is a X-ray diffraction pattern diagram for the Ni crystals in the surface layer 4, wherein a peak $b_3$ indicates a plane (111) as the close-packed plane $a_1$, and a peak $b_4$ indicates a plane (200). In this case, the percent area A of the close-packed planes $a_1$ in the slide surface 4a is equal to 65%. The Ni crystal structure in the slide surface 4a is shown by an electron photomicrograph (5,000× magnification) in FIG. 9.

In the respective surface layers 4 comprised of the Fe crystals, the Cr crystals and the Ni crystals, the inclination angle $\Theta$ of the close-packed plane $a_1$ were in the range of $0° \leq \Theta \leq 20°$.

Figure 10:
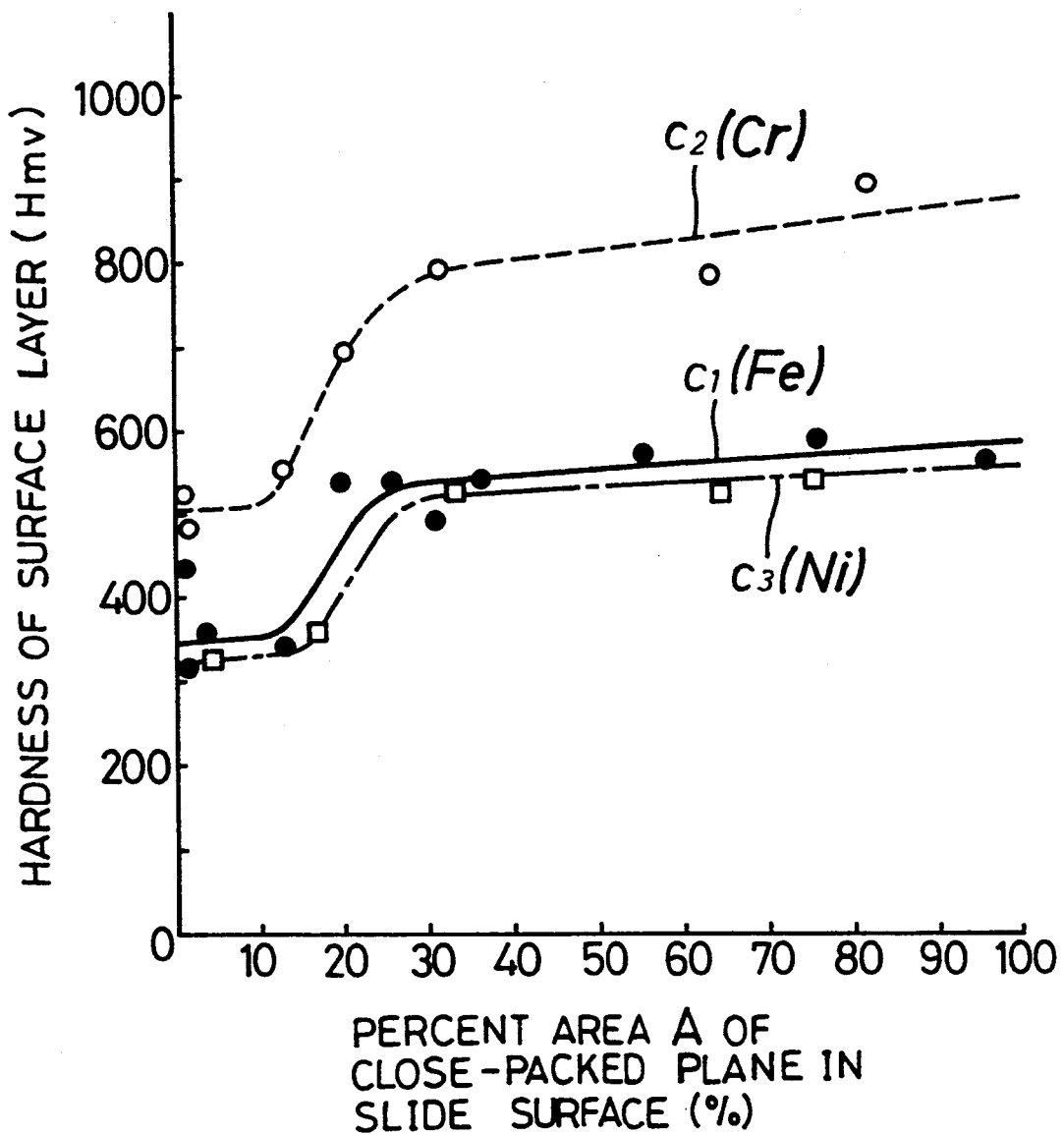

FIG. 10 illustrates results of a hardness test for the respective surface layers 4. A measurement using micro Vickers hardness was conducted with a hypermicrophotometer under a load of 5 g. In FIG. 10, a line $c_1$ indicates the result of the surface layer 4 comprised of the Fe crystals, a line $c_1$ indicates the result of the surface layer 4 comprised of the Cr crystals, and a line $c_3$ indicates the result of the surface layer 4 comprised of the Ni crystals.

As is apparent from FIG. 10, the hardness of the surface layer 4 can be improved by specifying the percent area A of the close-packed planes $a_1$ in the range of 30% or more.

Figure 11:
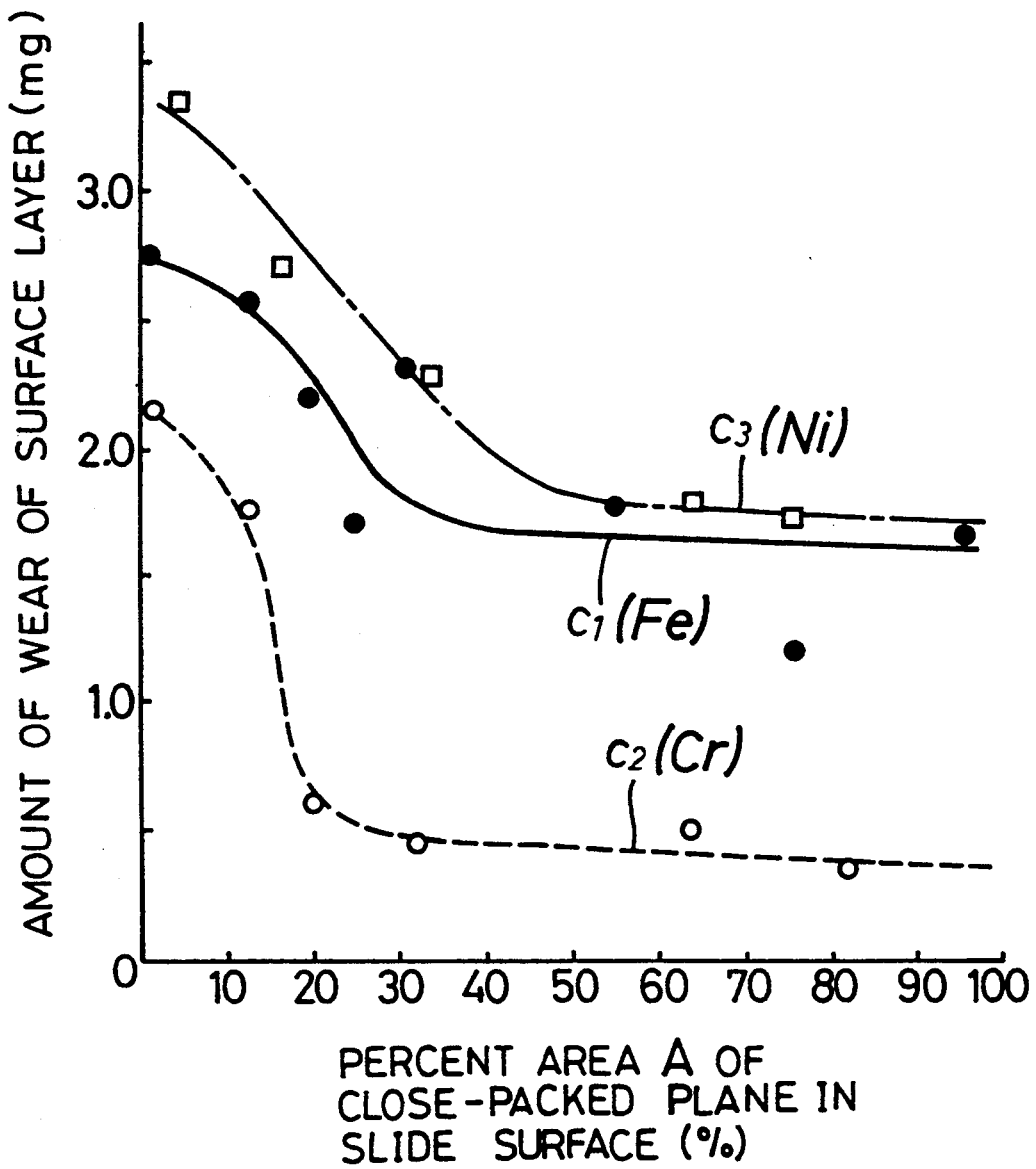

FIG. 11 illustrates results of a wear test for the respective surface layers 4. A measurement of the amount of wear was conducted with a tip-on-disk testing machine. The test conditions were as follows: the load on the tip was set at 10 kgf; the material of the disk was a nitrided carbon steel material (S48C material); the speed of revolutions of the disk was set at 0.5 m/sec; and the sliding distance was 1000 m. Lines $c_1$ to $c_3$ in FIG. 11 correspond to the lines $c_1$ to $c_3$ in FIG. 10, respectively.

As is apparent from FIG. 11, the wear resistance of the surface layer 4 can be improved by specifying the percent area A of the closepacked planes $a_1$ in the range of 30% or more.

The improved technology of this invention found in the above-described first embodiment is not limited to the above-described piston, but also is applicable to other slide members such as a pulley provided with a surface layer having metal crystals such as of Ni, Fe and Cr on a belt groove, a rocker arm for an internal combustion engine provided with a surface layer having metal crystals such as of Cr on a slipper, and a cam shaft for an internal combustion engine provided with a surface layer having metal crystals such as of Cr on a journal portion.

FIGS. 12 to 22 illustrate a second embodiment of the present invention.

Figure 12:
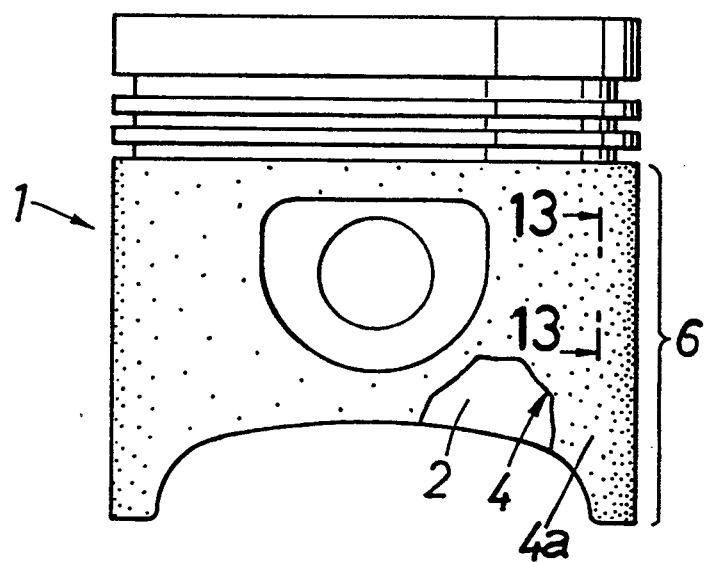
Figure 13:
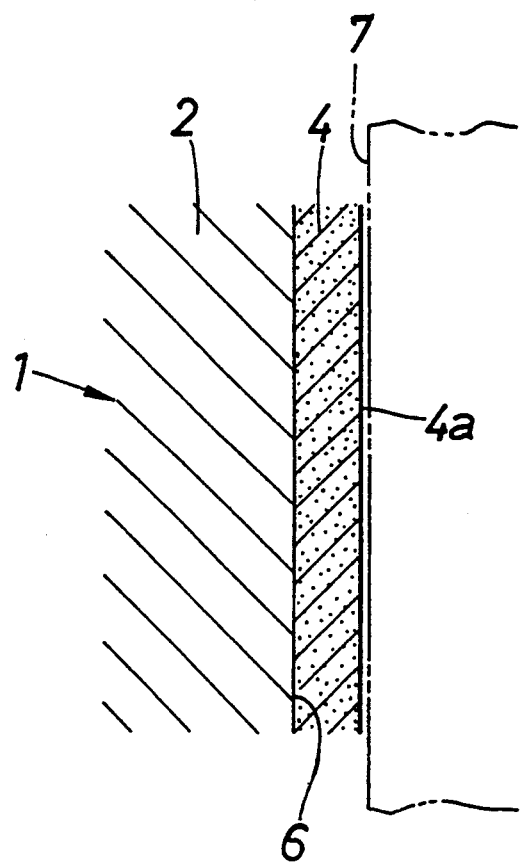

Referring to FIGS. 12 and 13, a piston 1 for an internal combustion engine, serving as a slide member, has a base material 2 of an Al alloy. A surface layer 4 is provided on an outer surface of a skirt portion 6 of the piston 1 the base material 2. The surface layer 4 has a slide surface 4a in contact with an inner surface 7 of a cylinder bore (a mating member).

The surface layer 4 is formed by an electroplating process and comprises an aggregate of metal crystals having a bcc structure. The metal crystals having a bcc structure are comprised, for example, of crystals such as of Fe, Cr, Mo, W, Ta, Zr, Nb, V and the like.

Figure 14:
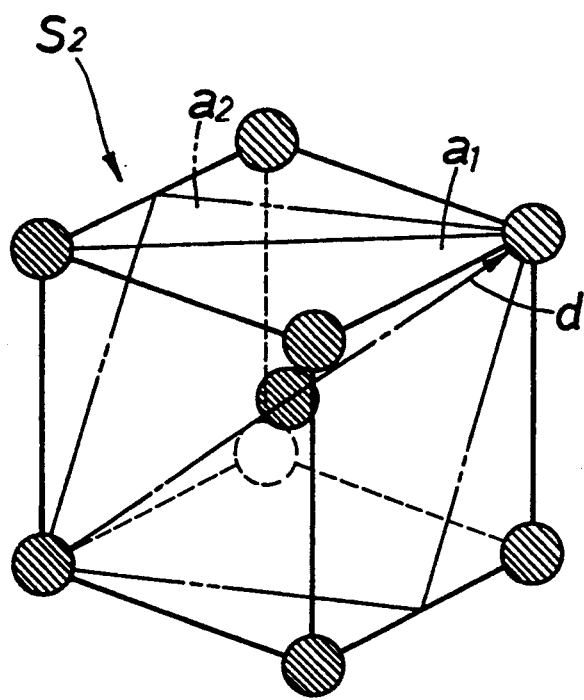

As shown in FIG. 14, a primary slip plane and thus close-packed plane $a_1$ in the bcc structure $S_2$ is a plane (110). The orientation d of slip is represented by the direction <111>. When a secondary slip plane is defined here as a crystal surface which includes the orientation of slip of the metal crystals and is highest in atomic density except the close-packed plane al, then the secondary slip plane $a_2$ corresponds to a plane (211) or a plane (123). In the illustration, a plane (211) is presented as the secondary slip plane $a_2$.

Predetermined crystals included in metal crystals have their secondary slip planes $a_2$ as a crystal plane of high atomic density directed toward and defining the slide surface 4a. The percent area B of the secondary slip planes $a_2$ in the slide surface 4a is set in the range of $B \geq 50\%$.

If the orientation property is applied to the metal crystals in the above manner, a high hardness can be achieved in the surface layer 4, thereby improving the wear resistance of the surface layer 4.

In addition, the density of cracks in the surface layer 4 is reduced and hence, in cooperation with the aforementioned high hardness property, the strength of the surface layer 4 can be improved. In the metal crystals, the orientation degree of the plane (211) as the secondary slip plane $a_2$ and the orientation degree of the plane (110) as the close-packed plane $a_1$ have a relationship such that the orientation degree of one of the planes decreases as the orientation degree of the other of the planes increases. In this case, as the orientation degree of the plane (110) increases the density of cracks in the surface layer 4 tends to increase. Therefore it is very advantageous to increase the orientation degree of the plane (211) in order to improve the strength of the surface layer 4. When the percent area B becomes less than 50%, the density of cracks in the surface layer 4 becomes higher, thereby reducing the strength of the surface layer 4.

Figure 15:
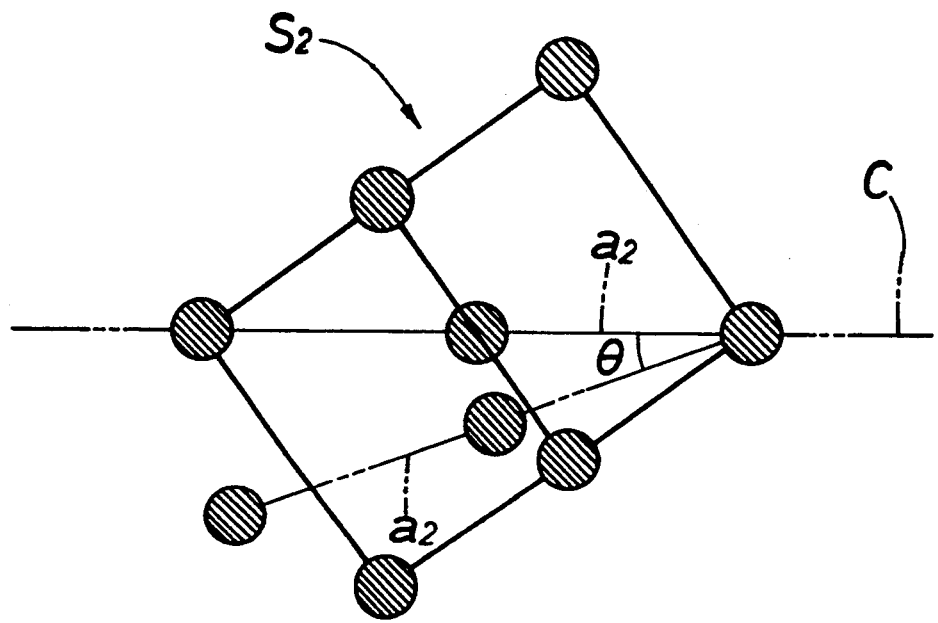

The inclination of the secondary slip plane $a_2$ with respect to a phantom plane C extending along the slide surface 4a affects the wear resistance of the surface layer 4. For that reason, the inclination angle e of the secondary slip plane $a_2$ in the bcc structure $S_2$ with respect to the phantom plane C is set in the range of $0° \leq \Theta \leq 30°$ as shown in FIG. 15. When the inclination angle $\Theta$ exceeds 30°, the wear resistance of the surface layer 4 deteriorates.

Samples preferred examples will now be described.

The outer surface of a skirt portion 6 in a base material 2 of an Al alloy was subjected to an electroplating process so as to form a surface layer 4 comprised of an aggregate of Fe crystals.

The conditions for the electroplating process were as follows: a plating bath of ferrous sulfate was used; the pH of the plating bath was 3 or less (constant); an additive of carbamide, boric acid, saccharin and ammonium sulfate was used; the temperature of the plating bath was 60° C.; and the cathode current density was 8 A/dm².

Figure 16:
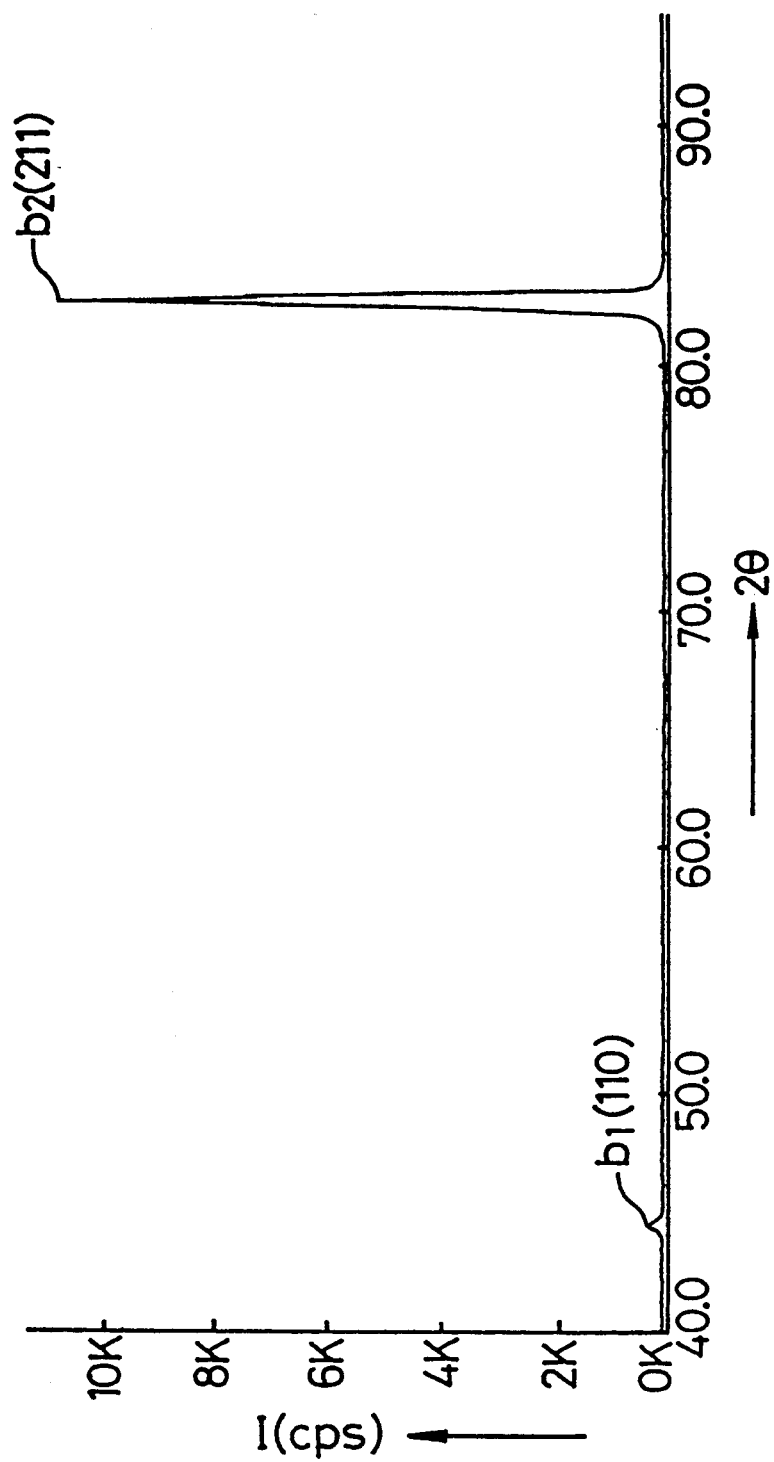
Figure 17:
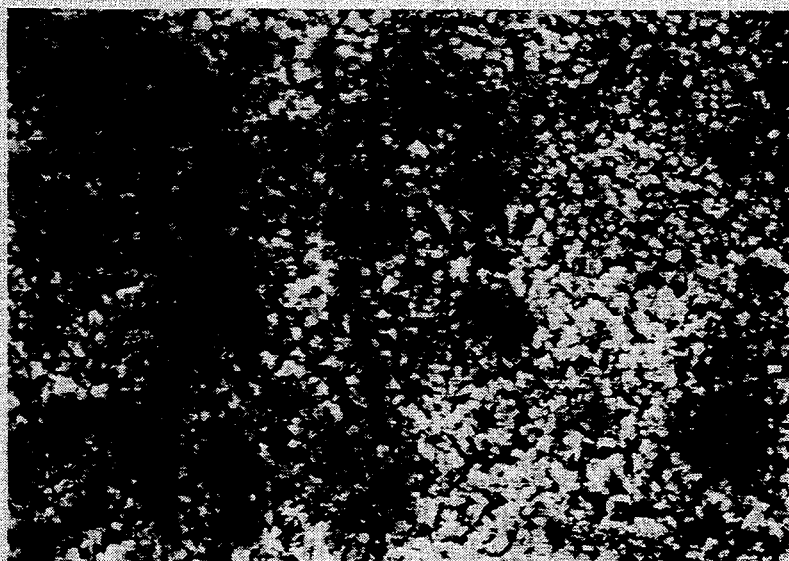

FIG. 16 is a X-ray diffraction pattern diagram for the Fe crystals in the surface layer 4, wherein a peak $b_1$ indicates a plane (110) as the close-packed plane $a_1$, and a peak $b_2$ indicates a plane (211) as the secondary slip plane $a_2$. It can be seen from FIG. 16 that Fe crystals are present in the surface layer 4 and are oriented so that the secondary slip plane $a_2$ lies in a plane parallel to the phantom plane C extending along the slide surface 4a.

In this case, the greater the height of the peak $b_2$, and thus the integrated strength of peak $b_2$, the greater the degree of orientation of plane $a_2$ of the Fe crystals with respect to the phantom plane C. This results in an increased percent area B of the secondary slip planes $a_2$ in the slide surface 4a. The orientation degree is controlled by varying the conditions for the electroplating process. In FIG. 16, the percent area B of the secondary slip planes $a_2$ in the slide surface 4a is 98% (B=98%). The structure of the Fe crystals in the slide surface 4a is shown by an electron photomicrograph (5,000× magnification) in FIG. 17. The inclination angle $\Theta$ of the secondary slip plane $a_2$ is in the range of $0° \leq \Theta \leq 20°$.

Figure 18B:
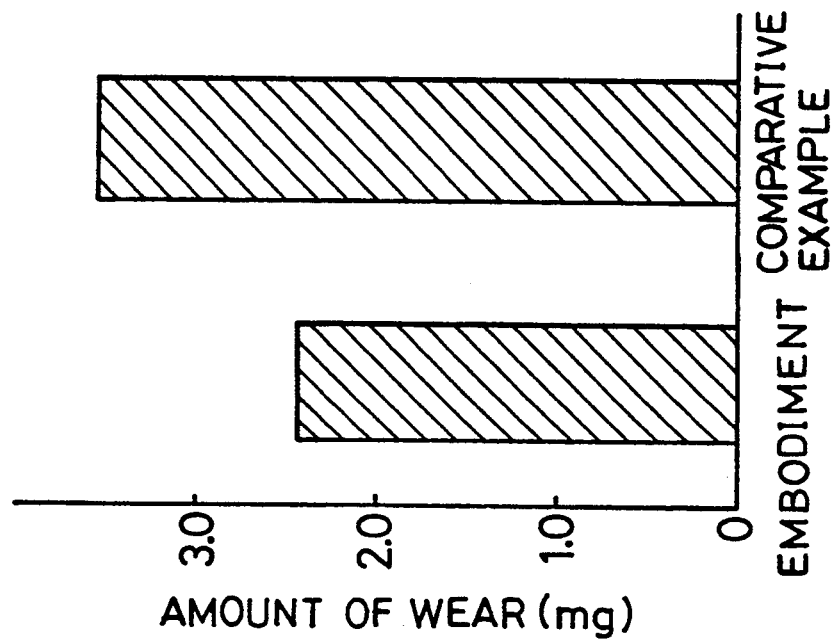
FIG. 18B is a graph illustrating the amount of wear of surface layers according to the embodiment and the comparative example.
Figure 18A:
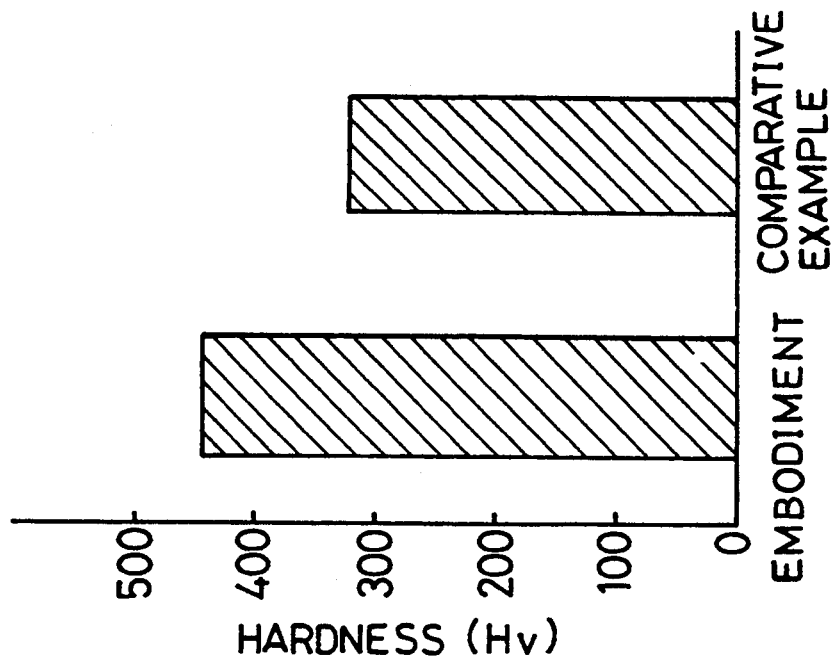
FIG. 18A is a graph illustrating the hardness of surface layers according to the embodiment and a comparative example.

FIG. 18A illustrates a comparison in hardness between the surface layers of the embodiment and a comparative example. FIG. 18B illustrates a comparison in the amount of wear between the surface layers of the embodiment and a comparative example. The surface layer of the embodiment has the slide surface in which the percent area B of the secondary slip planes $a_2$ is 98%. In the surface layer of the comparative example, the crystal surfaces are oriented at random. A measurement of the amount of wear was conducted with a tip-on-disk testing machine. The test conditions were as follows: the load on the tip was set at 10 kgf; the material of the disk was a nitrid carbon steel material (S48C material); the speed of the revolutions was set at 0.5 m/sec; and the sliding distance was 1000 m.

As is apparent from FIGS. 18A and 18B, the surface layer of the embodiment exhibits a higher hardness as compared with the surface layer of the comparative example. As a result, the surface layer of the embodiment exhibits a superior wear resistance.

FIG. 19A illustrates a comparison in the density of cracks between the surface layers of the embodiment, a comparative example and a referential example. FIG. 19B illustrates a comparison in the strength between the surface layers of the embodiment and the comparative example. The surface layers of the embodiment and the comparative example are the same as those in FIGS. 18A and 18B. The surface layer of the referential example is one in which the percent area A of the close-packed planes $a_1$ and thus of the planes (110) in the slide surface is 70% and the percent area B of the secondary slip planes $a_2$ is 30%.

Figure 20:
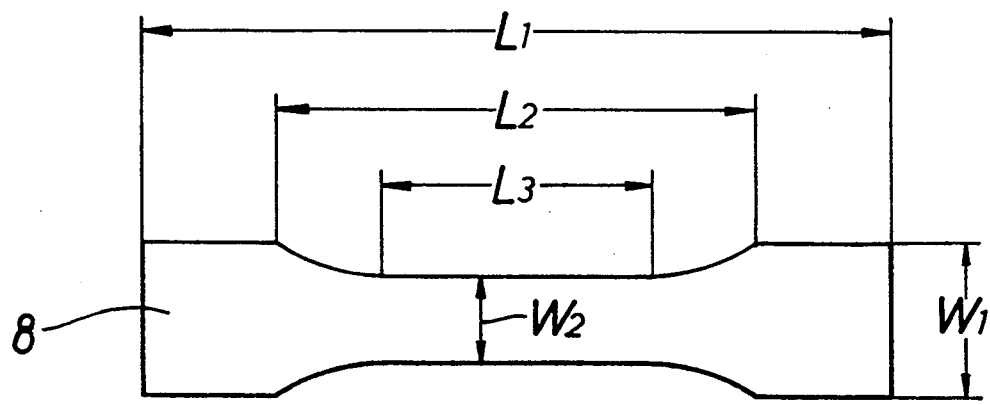

The strength values were measured by a tension test under the following conditions. FIG. 20 shows a test piece 8 with an entire length $L_1$=50 mm; a width $W_1$ at opposite ends=10.5 mm; a length $L_2$ between shoulders=32 mm; a length $L_3$ of a constant width portion=18 mm; a width $W_2$ of the constant width portion=6 mm; and a thickness of 20 μm. The foil-formed test piece 8 was obtained by the process of first forming a test piece of the same structure as of the surface layer 4 by subjecting a stainless plate of the same dimension as of the test to an electroplating process, and then separating the test piece 8 from the stainless plate. The tensile load rate was 20 mm/min under room temperature.

As is apparent from FIGS. 19A and 19B, the surface layer of the embodiment exhibits an extremely low value in the density of cracks compared to the surface layer of the comparative example. However, the surface layer of the embodiment is superior to the surface layer of the comparative example in strength. The superior strength is achieved by not only the low density of cracks, but also the high hardness.

It should be noted from FIG. 19A that the density of cracks becomes higher in the surface layer of the referential example due to an increase in the orientation degree of the plane (110).

Figure 21:
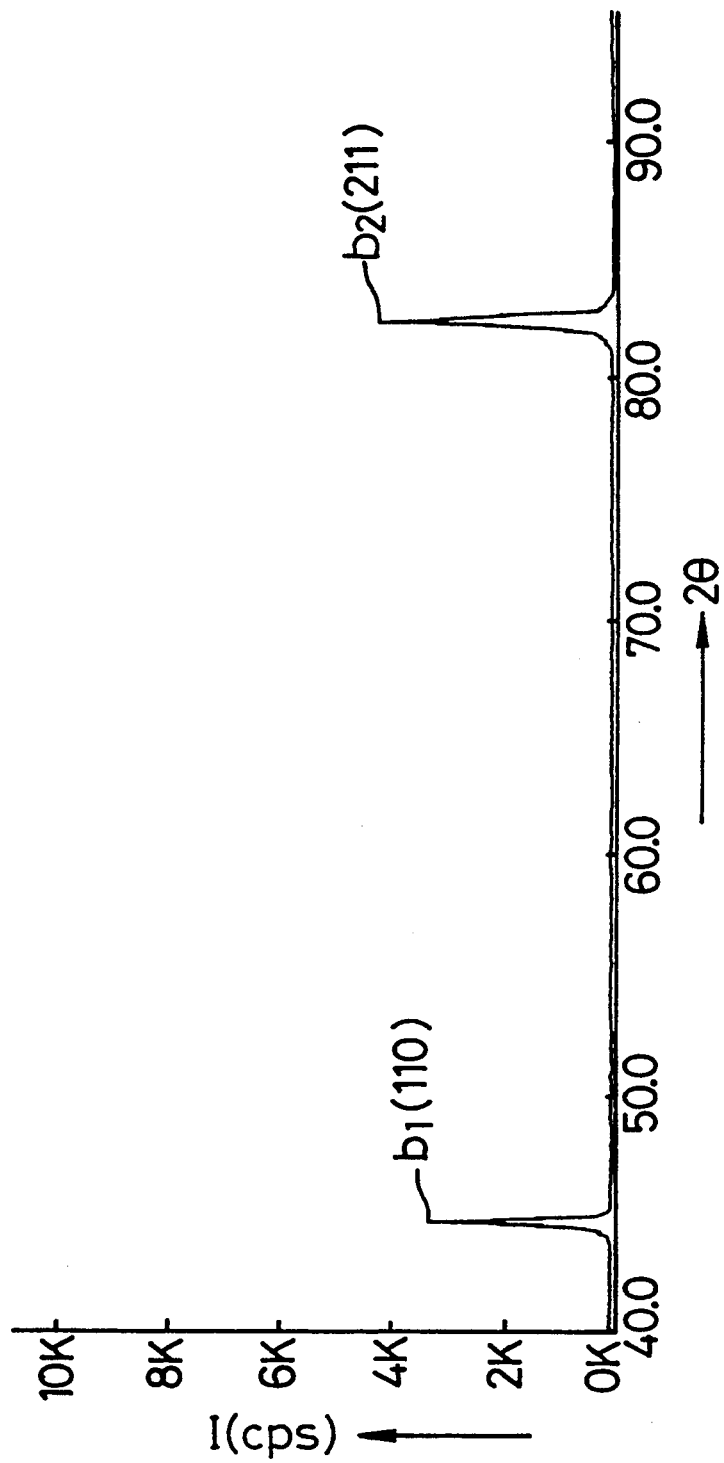
Figure 22:
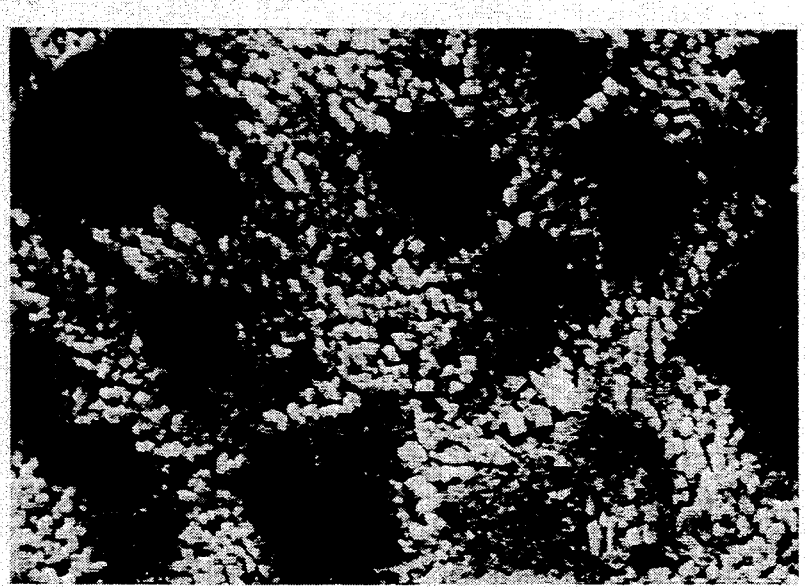

FIG. 21 is a X-ray diffraction pattern diagram for the Fe crystals in the surface layer 4 of another example, wherein a peak $b_1$ indicates a plane (110) as the close-packed plane $a_1$, and a peak $b_2$ indicates a plane (211) as the secondary slip plane $a_2$. In this case, the percent area B of the secondary slip plane $a_2$ in the slide surface 4a is 53% (B=53%). The Fe crystal structure in the slide surface 4a is shown by an electron photomicrograph (5,000× magnification) in FIG. 22. The inclination angle $\Theta$ of the secondary slip plane $a_2$ is in the range of $0° \leq \Theta \leq 20°$.

It should be noted that the improved technology of this invention in the above-described second embodiment is not limited to the above-described piston, but also is applicable to other slide members such as an intake or an exhaust valve of an internal combustion engine provided with a surface layer on a stem portion, a rocker shaft for an internal combustion engine provided with a surface layer on a portion to be supported, and a cam shaft for an internal combustion engine provided with a surface layer on a journal portion.

FIGS. 23 to 33 illustrate a third embodiment of the present invention.

Figure 23:
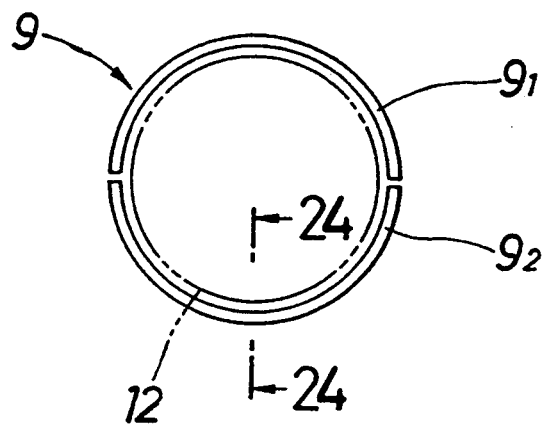
Figure 24:
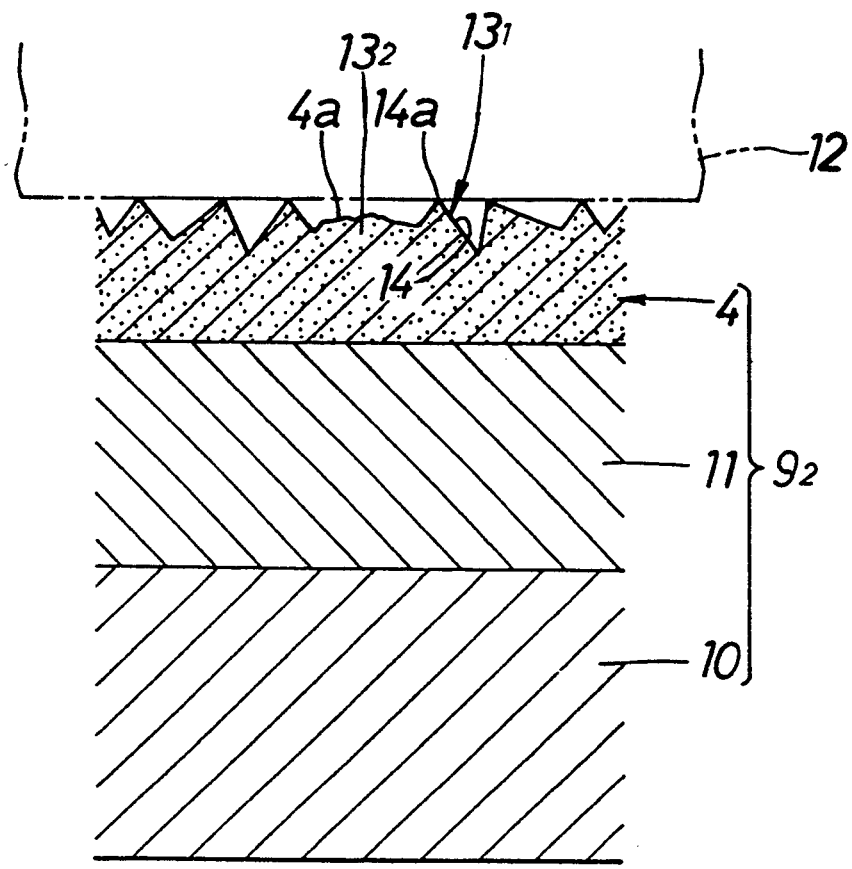

Referring to FIGS. 23 and 24, a slide bearing 9 as a slide member is applicable to a journal portion of a crankshaft in an engine, an enlarged end of a connecting rod or the like, and is comprised of a first half $9_1$ and a second half $9_2$. The halves $9_1$ and $9_2$ have the same configuration and each includes: a backing 10; a lining layer 11 formed on an inner peripheral surface of the backing 10; and a surface layer 4 formed on a surface of the lining layer 11 and having a slide surface 4a in contact with a mating member 12. Optionally, a Cu plated layer may be provided between the backing 10 and the lining layer 11, and an Ni plated barrier layer may be provided between the lining layer 11 and the surface layer 4.

The backing 10 is formed from a rolled steel plate. The thickness of the backing 10 depends upon the thickness set for the slide bearing 9. The lining layer 11 is formed from copper, copper based alloy, aluminum, aluminum based alloy, etc. The thickness of the lining layer 11 is in the range of 50 to 500 μm and normally on the order of 300 μm. The surface layer 4 is formed from an aggregate of crystals of a Pb alloy. The thickness of the surface layer 4 is set in the range of 5 to 50 μm and normally on the order of 20 μm.

The Pb alloy forming the surface layer 4 contains 80 to 90% by weight of Pb and 3 to 20% weight of Sn. If necessary, the Pb alloy may contain at most 10% by weight of at least one element selected from the group consisting of Cu, In, Ag, Tl, Nb, Sb, Ni, Cd, Te, Bi, Mn, Ca and Ba.

Cu, Ni and Mn have a function to increase the hardness of the surface layer 4. However, when the content of Cu, Ni and/or Mn exceeds 10% by weight, the resulting surface layer has an excessively high hardness, which will resulted in a reduced initial conformability. When Cu or the like is added, it is desirable to control the Cu content such that the hardness Hmv of the resulting surface layer 4 is in the range of 15 to 25.

Each of In, Ag, Tl, Nb, Sb, Cd, Te, Bi, Ca and Ba has a function to soften the surface layer 4 to improve an initial conformability. However when the content of such elements exceeds 10% by weight, the resulting surface layer 4 has a reduced strength. When In or the like is added, it is desirable to control the In content such that the hardness Hmv of the resulting surface layer 4 is in the range of 8 to 15.

The surface layer 4 is formed by an electroplating process, wherein a plating solution used is a borofluoride based plating solution containing 40 to 180 g/liter of $Pb^{2+}$, 1.5 to 35 g/liter of $Sn^{2+}$ and optionally, at most 15 g/liter of $Cu^{2+}$ together with an additive. The additive which may be used an organic additive and includes at least one selected form the group consisting of a quinone based compound such as hydroquinone, catechol, etc., an amino acid based compound such as gelatin, peptone, etc., and an aldehyde such as benzaldehyde, vanillin. The added amount of the organic additives is set in the range of 1.5 to 18 g/liter in total. Optionally, borofluoric acid and/or boric acid may be added to the plating solution to control the electrical resistance during energization. The temperature of the plating solution is set in the range of 5° to 35° C., and the cathode current density is set in the range of 3 to 15 $A/dm^2$.

The surface layer 4 has first oriented crystals with a plane (h00) of high atomic density directed so as to form the slide surface 4a. The first oriented crystals have a function to improve the sliding characteristic of the surface layer 4. The surface layer 4 may have, in addition to the first oriented crystals, second oriented crystals with planes (111) and (222) directed toward the slide surface.

In Pb alloy crystals, the plane (h00) and the plane (111) including (222) have a relationship such that as one of the planes (h00) and (111) increases, the other of the planes decreases. Accordingly, except in a surface layer 4 comprised of only the first oriented crystals, the first oriented crystals should be considered in correlation with the second oriented crystals.

In view of the above point, the presence rate of the first oriented crystals in the surface layer 4 is set in the following manner:

Where the integrated strength of the first oriented crystals having the plane (h00) directed toward the slide surface 4a is represented by I(a), and the integrated strength of the second oriented crystals with the planes (111) and (222) directed toward the slide surface 4a is represented by I(b), under application of an X-ray diffractometry to the surface layer 4, the following relation is established: $0.6 \leq I(a)/\Sigma I(ab) \leq 1.0$ wherein $\Sigma I(ab) = I(a) + I(b)$; $I(b) = 0$ is included; and $I(a)/\Sigma I(ab)$ represents the presence rate $R_1$ of the first oriented crystals.

Figure 25:
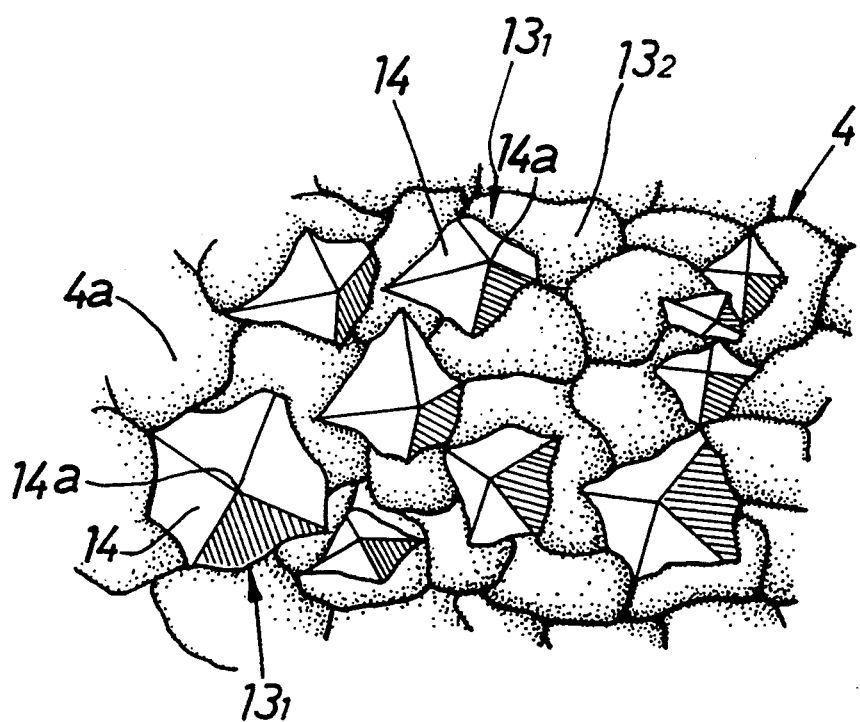
Figure 26:
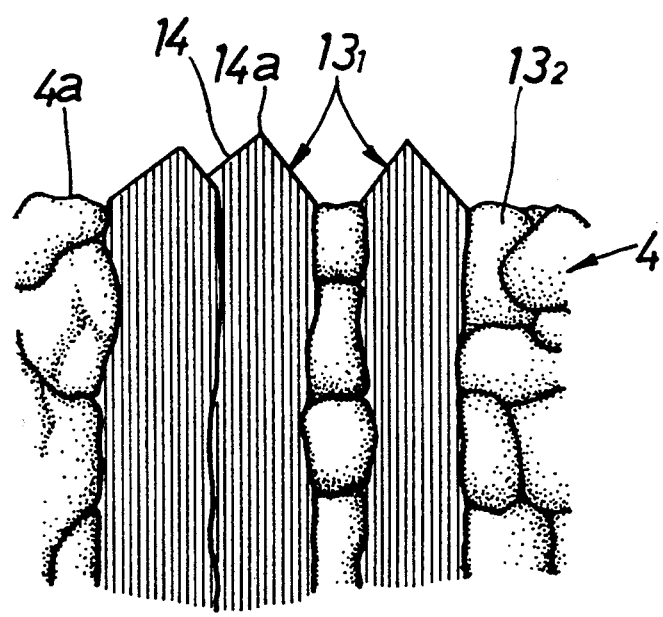

As shown in FIGS. 25 and 26, the first oriented crystals $13_1$ with the plane (h00) directed toward the slide surface are columner crystals extending from the lining layer 11 and having a quadrangular pyramid-shaped tip end 14 for forming the slide surface 4a in cooperation.

If the presence rate $R_1$ of the first oriented crystals $13_1$ is set in the above-described manner, the apexes 14a of the quadrangular pyramid-shaped tip ends 14 are caused to be preferentially worn out whereby the initial conformability of the surface layer 4 is improved. In addition, the surface area of the slide surface 4a can be enlarged by the quadrangular pyramid-shaped tip ends 14, so that the surface layer 4 has a sufficient oil retention property. This enhances the seizure resistance of the surface layer 4.

Because the first oriented crystal 13, has a face-centered cubic structure due to the orientation of the plane (h00), the atomic density increases in the direction of the orientation. This provides the surface layer 4 with a high hardness and a high oil retention property, thereby improving the wear resistance of the surface layer. In FIGS. 25 and 26, the reference numeral $13_2$ represents second oriented crystals which are granular.

In order to provide an excellent sliding characteristic as described above, the inclination of the first oriented crystals $13_1$ should be considered.

Figure 27:
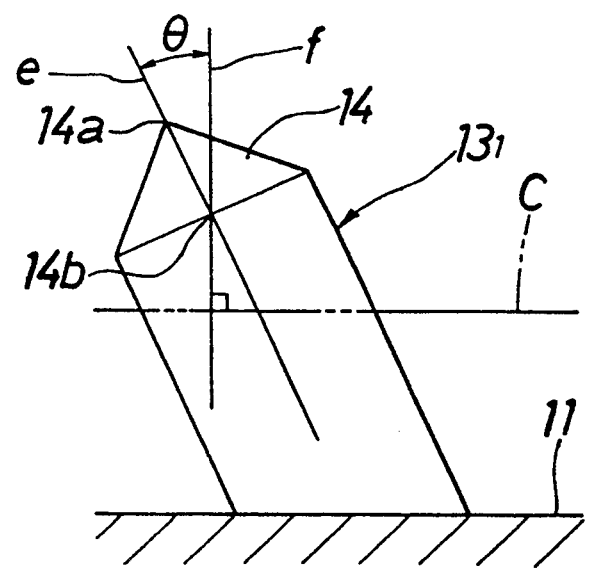

Referring to FIG. 27, if a phantom plane C extending along the slide surface 4a is defined on the side of a base surface of the quadrangular pyramid-shaped tip end 14, and an inclination angle defined by a straight line e passing through the apex 14a of the quadrangular pyramid-shaped tip end 14 and a central portion 14b of the base surface and by a referential line f extending perpendicular to the phantom plane C through the central portion 14b is defined as $\Theta$, the inclination angle $\Theta$ of the first oriented crystals $13_1$ is set in the range of $0° \leq \Theta \leq 30°$. When the inclination angle $\Theta$ becomes larger than 30° ($\Theta > 30°$), the oil retention property of the surface layer 4 and the preferential wearing of the apexes 14a are reduced thereby to deteriorate the seizure resistance and wear resistance of the surface layer 4.

Preferred examples will now be described.

A lining layer 3 of a Cu alloy was subjected to an electroplating process to form thereon a surface layer 4 comprised of an aggregate of Pb alloy crystals.

The conditions for the electoplating process were as follows: the plating solution was a boro-fluoride plating solution containing 100 g/liter of $Pb^{2+}$, 10 g/liter of $Sn^{2+}$ and 3 g/liter of $Cu^{2+}$; the additive was an organic additive; the temperature of the plating solution was 25° C.; and the current density was 8 $A/dm^2$.

Figure 28:
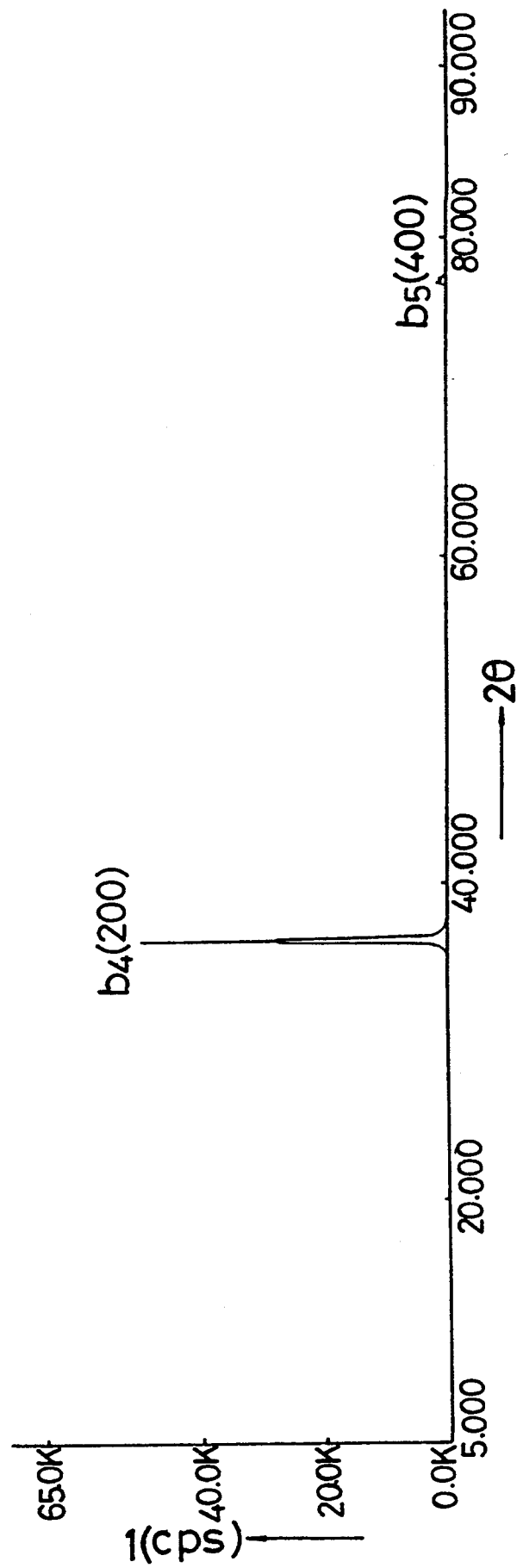

FIG. 28 is a X-ray diffraction pattern diagram for the Pb crystals in the surface layer 4, wherein a peak $b_4$ indicates a plane (200), and a peak $b_5$ indicates a plane (400). Both of the planes (200) and (400) belong to the plane (h00). It is confirmed from FIG. 28 that the surface layer 4 is comprised of only the first oriented crystals $13_1$. In this case, the total integrated strength $\Sigma I(ab)$ is 679,996 ($\Sigma I(ab) = 679,996$) with the proviso that $I(b) = 0$. The value is equal to the integrated strength I (a) of the first oriented crystals $13_1$. Therefore the presence rate $R_1$ of the first oriented crystals $13_1$ is equal to 1.0 ($R_1 = 1.0$).

Figure 29:
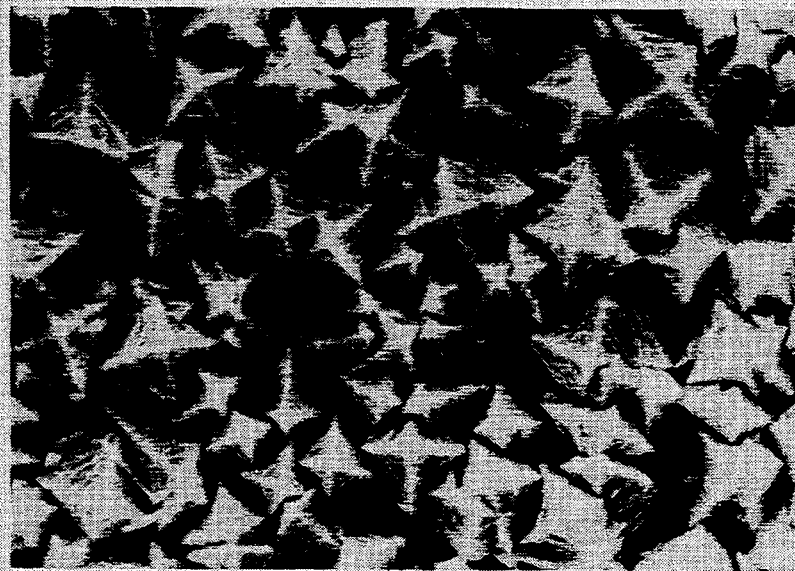
Figure 30:

FIG. 29 is an electron photomicrograph (10,000× magnification) showing the structure of Pb alloy crystals in the slide surface 4a. FIG. 30 is an electron photomicrograph (5,000× magnification) showing the structure of Pb alloy crystals at a longitudinal section of the surface layer 4. It can be seen from FIGS. 29 and 30 that the surface layer 4 is comprised of the first oriented crystals $13_1$ namely the columnar crystals and the slide surface 4a is formed of quadrangular pyramid-shaped tip ends 14. The inclination angle $\Theta$ of the first oriented crystals $13_1$ is in the range of $0° \leq \Theta \leq 10°$. The Pb alloy contains 8% by weight of Sn and 2% by weight of Cu.

Figure 31:

FIG. 31 is an electron photomicrograph (10,000× magnification) showing the structure of Pb alloy crystals in another slide surface 4a. Second oriented crystals $13_2$ of granular share are also observed from FIG. 31 in addition to the quadrangular pyramid-shaped tip ends 14.

In FIG. 31, the integrated strength I(a) of the first oriented crystals $13_1$ is 37,172 (I(a)=37,172) and the integrated strength I(b) of the second oriented crystals $13_2$ is 24,781 (I(b)=24,781). Therefore the presence rate $R_1$ of the first oriented crystals $13_1$ becomes 0.6 ($R_1$=0.6). The inclination angle $\Theta$ of the first oriented crystals $13_1$ is in the range of $0° \leq \Theta \leq 10°$.

Figure 32:
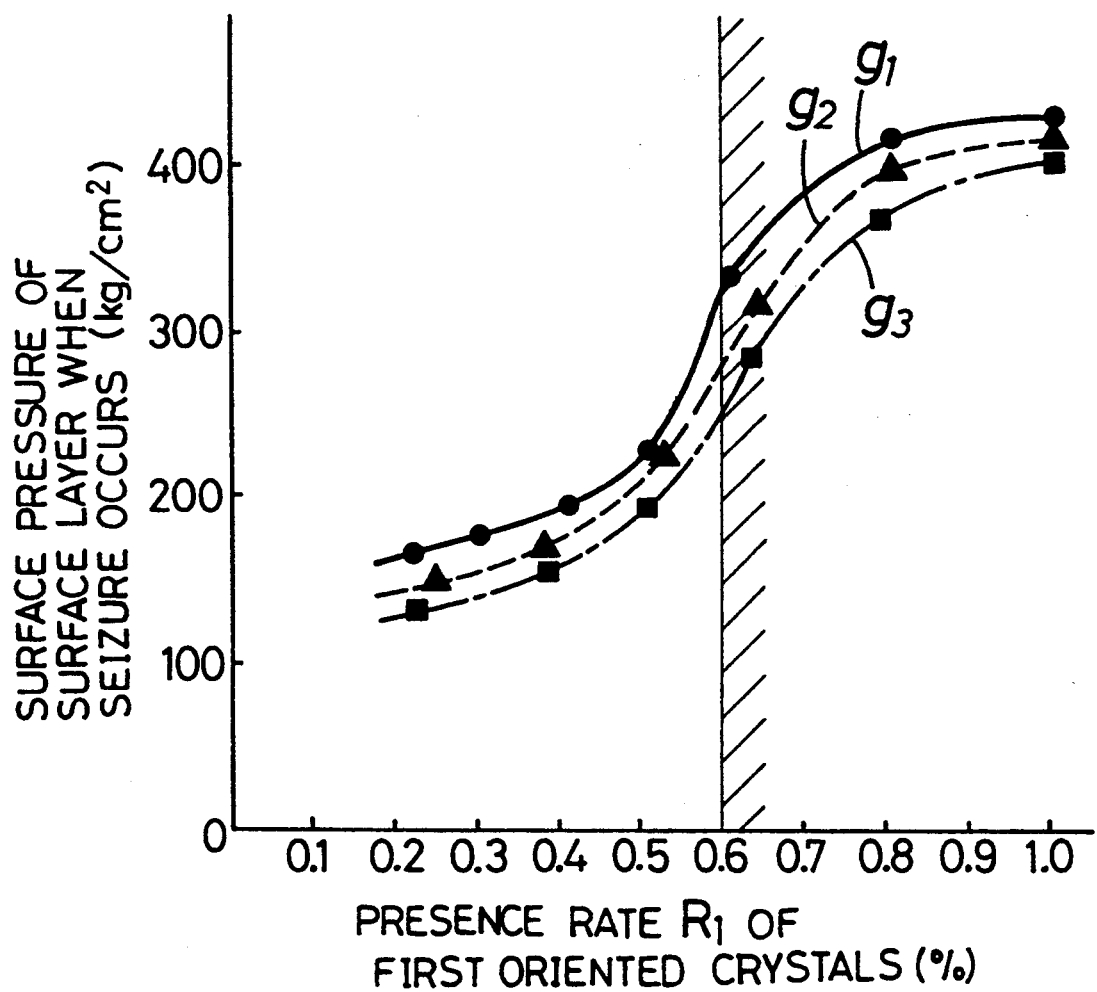

FIG. 32 illustrates the relationship between the presence rate $R_1$ of the first oriented crystals $13_1$ and the surface pressure when the seizure occurs for surface layers 4 of various slide bearings 9. In FIG. 32, the line $g_1$ represents the relationship in a case where the inclination angle $\Theta$ of the first oriented crystals $13_1$ is in the range of $0° \leq \Theta \leq 10°$, the line $g_3$ represents the relationship in a case where the inclination angle $\Theta$ of the first oriented crystals $13_1$ is in the range of $0° \leq \Theta \leq 20°$, and the line $g_3$ represents the relationship in a case where the inclination angle $\Theta$ of the first oriented crystals $13_1$ is in the range of $0° \leq \Theta \leq +°$.

The seizure test was carried out by bringing each of the slide bearings 9 into sliding contact with a rotary shaft and gradually increasing the load applied to the slide bearings 9.

The test conditions were as follows: the material of the rotary shaft was a nitrided JIS S48C material; the speed of rotation of the rotary shaft was 6,000 rpm; the oil supply temperature was 120° C.; the oil supply pressure was 3 kg/cm$^2$; and the applied load was 1 kg/sec.

As is apparent from FIG. 32, the seizure resistance of the surface layer 4 can be improved by setting the presence rate $R_1$ of the first oriented crystals $13_1$ at a level equal to or more than 0.6 ($R_1 \geq 0.6$). A preferable range of the presence rate $R_1$ of the first oriented crystals 13, is $0.8 \leq R_1 \leq 1.0$. It should be noted that the most excellent seizure resistance is obtained when $R_1$=1.0.

In the surface layer 4, third oriented crystals, namely Pb metal crystals with a crystal face other than of planes (h00), (111) and (222) being directed toward the slide surface, may be precipitated in some cases. The crystal face includes planes (220), (311), (331) and (420). The third oriented crystals adversely affect the seizure resistance of the surface layer and hence, it is necessary to suppress the presence rate of the third oriented crystals.

In view of this problem, the presence rate of the third oriented crystals in the surface layer is set in the following manner:

Where the integrated strength of the first oriented crystals with the plane (h00) directed toward the slide surface 4a is represented by, I(a), the integrated strength of the second oriented crystals with the planes (111) and (222) directed toward the slide surface 4a is represented by I(b) and the integrated strength of the third oriented crystals with planes other than the planes (h00), (111) and (222) directed toward the slide surface 4a is represented by I(c), under application of an X-ray diffractometry to the surface layer 4, the following relation is established:

$$I(c)/\Sigma I(abc) \leq 0.2$$

wherein $\Sigma I(abc) = I(a) + I(b) + I(c)$; 1(b)=0 is included; and $I(c)/\Sigma I(abc)$ represents the presence rate $R_2$ of the third oriented crystals.

Figure 33:
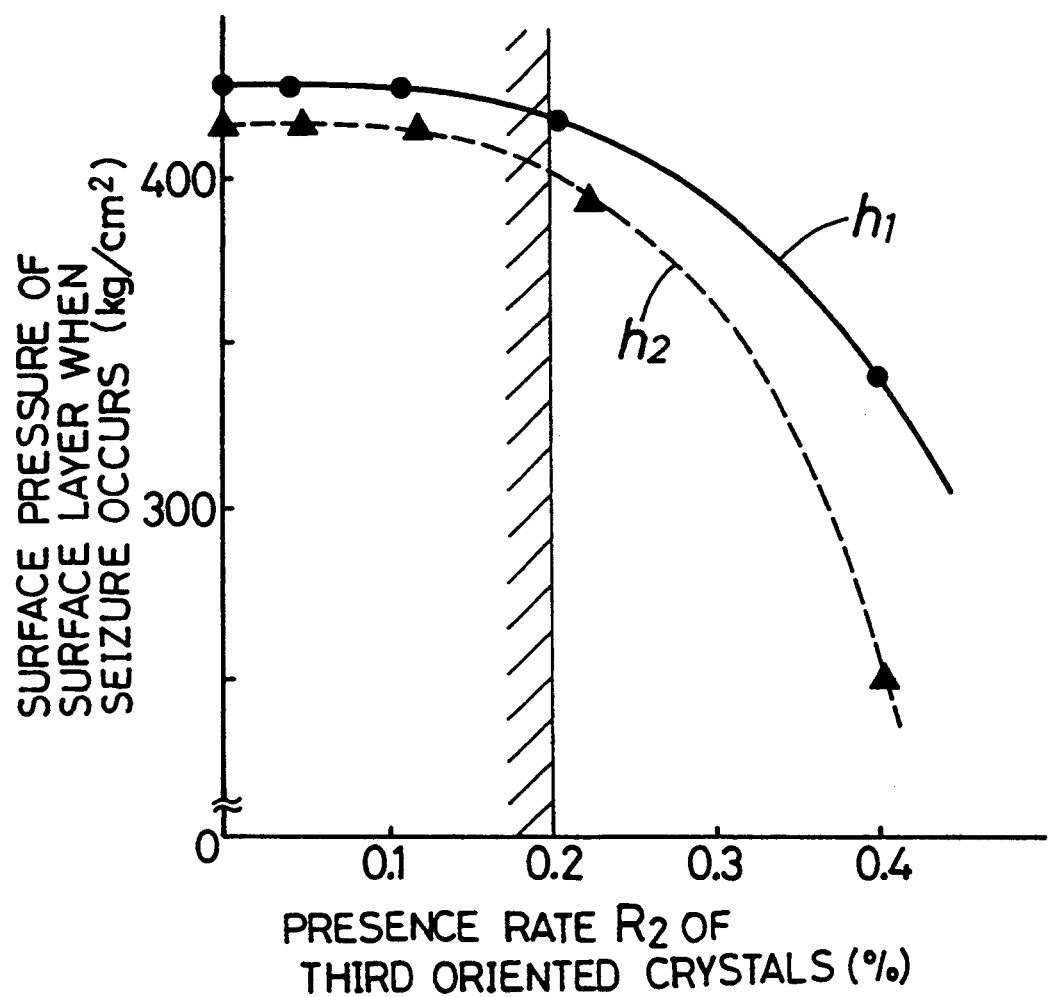

FIG. 33 illustrates the relationship between the presence rate $R_2$ of the third oriented crystals and the surface pressure at the generation of seizure for the surface layers 4 of various slide bearings 9. In FIG. 33, the line $h_1$ represents the relationship in a case where the presence rate $R_1$ of the first oriented crystals $13_1$ is 1.0 ($R_1$=1.0) and thus I(b)=0 and the surface layer 4 is comprised of the first and third oriented crystals. The line $h_2$ represents the relationship in a case where the presence rate $R_1$ of the first oriented crystals $13_1$ is 0.8 ($R_1$=0.8) and the surface layer 4 is comprised of the first, second and third oriented crystals. The seizure test was carried out in the same manner and under the same conditions as those described above.

As is apparent from FIG. 33, the seizure resistance can be improved by setting the presence rate $R_2$ of the third oriented crystals at a level equal to or less than 0.2 ($R_2 \leq 0.2$). The presence rate $R_2$ of the third oriented crystals is preferably set in the range of $R_2 \leq 0.1$. It is to be noted that $R_2 \leq 0$ corresponds to the case where no third oriented crystals exist in the surface layer 4.

The optimum state of the surface layer 4 is achieved when the inclination angle e of the first oriented crystals $13_1$ is in the range of $0° \leq \Theta \leq 10°$ and when the presence rate $R_1$ of the first oriented crystals 13, is determined by the following expression:

$$R_1 = I(a)/\Sigma I(abc) \geq 0.8$$

It should be noted that the third embodiment of the present invention is also applicable to slide members other than the described slide bearing.

What is claimed is:

1. A slide member comprising a surface layer having a slide surface for a mating member, wherein the surface layer is formed of an aggregate of crystals of a Pb alloy, and under application of an X-ray diffractometry to the surface layer, when I(a) represents an integrated strength of first oriented crystals with a (h00) plane by Miller indices thereof being directed toward the slide surface, and I(b) represents an integrated strength of second oriented crystals with (111) and (222) planes by Miller indices thereof being directed toward the slide surface, the following expression being established:

$$0.6 \leq I(a)/\Sigma I(ab) \leq 1.0$$

wherein $\Sigma I(ab) = I(a) + I(b)$, and I(b)=0 is included.

2. A slide member comprising a surface layer having a slide surface for a mating member, wherein the surface layer is formed of an aggregate of crystals of a Pb alloy, said crystal including first, second and third oriented crystals, and under application of an X-ray diffractometry to the surface layer, when I(a) represents an integrated strength of the first oriented crystals with a (h00) plane by Miller indices thereof being directed toward the slide surface, I(b) represents an integrated strength of the second oriented crystals with (111) and (222) planes by Miller indices thereof being directed toward the slide surface, and I(c) represents an integrated strength of the third oriented crystals with planes other than the (h00), (111) and (222) planes by Miller indices thereof being directed toward the slide surface, the following expression being established:

$$I(c)/\Sigma I(abc) \leq 0.2$$

wherein $\Sigma I(abc) = I(a) + I(b) + I(c)$, and I(b)=0 is included.

3. A slide member according to claim 1 or 2 wherein an inclination angle $\Theta$ of an axis of each the first oriented crystals relative to a line perpendicular to a plane on which the slide surface lies is in a range of $0° \leq \Theta \leq 30°$.

* * * * *